US012432441B2

(12) United States Patent
Desserrey et al.

(10) Patent No.: US 12,432,441 B2
(45) Date of Patent: Sep. 30, 2025

(54) CUSTOMIZING A CAPTURE BUTTON USED DURING VIDEO RECORDING

(71) Applicant: Snap Inc., Santa Monica, CA (US)

(72) Inventors: Laurent Desserrey, Los Angeles, CA (US); Ranidu Lankage, Belmont, CA (US); Jane Meng, Los Angeles, CA (US); Evan Spiegel, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 198 days.

(21) Appl. No.: 18/326,751

(22) Filed: May 31, 2023

(65) Prior Publication Data

US 2024/0406538 A1    Dec. 5, 2024

(51) Int. Cl.
H04N 23/63    (2023.01)
G06F 3/04817    (2022.01)
(Continued)

(52) U.S. Cl.
CPC ....... H04N 23/632 (2023.01); G06F 3/04817 (2013.01); G06F 3/0488 (2013.01); G06T 19/006 (2013.01)

(58) Field of Classification Search
CPC .... H04N 23/632; H04N 23/62; H04N 23/631; H04N 23/64; H04N 23/63; H04N 23/633;
(Continued)

(56) References Cited

U.S. PATENT DOCUMENTS 7,971,156 B2    6/2011   Albertson et al.
7,996,793 B2    8/2011   Latta et al.
(Continued)

FOREIGN PATENT DOCUMENTS

CN    103049761    8/2016
EP    3707693    9/2020
(Continued)

OTHER PUBLICATIONS

Social Nation, Here's how users can modify Snapchat+ Capture Button, Dec. 27, 2022, https://www.socialnationnow.com/ heres-how-users-can-modify-the-snapchat-capture-button (Year: 2022).*

*Primary Examiner* — Albert H Cutler
(74) *Attorney, Agent, or Firm* — Schwegman Lundberg & Woessner, P.A.

(57) ABSTRACT

Aspects of the present disclosure involve a system comprising a computer-readable storage medium storing a program and method for customizing a capture button used during video recording. The program and method provide for determining that a user of an application has access to exclusive features within the application, customizing a capture button for replacing display of a shutter button during video recording; displaying a first user interface for user selection of the capture button from among plural available capture buttons; receiving user input provided selecting the capture button from among the plural available capture buttons; displaying a second user interface for presenting real-time image data captured by a camera, the second user interface including the shutter button which is user-selectable to initiate video recording in response to second user input; and replacing, upon detecting the second user input, display of the shutter button with the selected capture button.

18 Claims, 12 Drawing Sheets

(51) Int. Cl.
*G06F 3/0488* (2022.01)
*G06T 19/00* (2011.01)

(58) Field of Classification Search
CPC ............... H04N 23/634; H04N 23/635; G06F 3/04817; G06F 3/0488; G06T 19/006
See application file for complete search history.

(56) References Cited

U.S. PATENT DOCUMENTS

| | | | |
|---|---|---|---|
| 8,487,938 | B2 | 7/2013 | Latta et al. |
| 8,856,691 | B2 | 10/2014 | Geisner et al. |
| 9,225,897 | B1 | 12/2015 | Sehn et al. |
| 9,230,160 | B1 | 1/2016 | Kanter |
| 9,276,886 | B1 | 3/2016 | Samaranayake |
| 9,705,831 | B2 | 7/2017 | Spiegel |
| 9,742,713 | B2 | 8/2017 | Spiegel et al. |
| 10,102,423 | B2 | 10/2018 | Shaburov et al. |
| 10,284,508 | B1 | 5/2019 | Allen et al. |
| 10,439,972 | B1 | 10/2019 | Spiegel et al. |
| 10,509,466 | B1 | 12/2019 | Miller et al. |
| 10,514,876 | B2 | 12/2019 | Sehn |
| 10,579,869 | B1 | 3/2020 | Xiong et al. |
| 10,614,855 | B2 | 4/2020 | Huang |
| 10,748,347 | B1 | 8/2020 | Li et al. |
| 10,958,608 | B1 | 3/2021 | Allen et al. |
| 10,962,809 | B1 | 3/2021 | Castañeda |
| 10,996,846 | B2 | 5/2021 | Robertson et al. |
| 10,997,787 | B2 | 5/2021 | Ge et al. |
| 11,012,390 | B1 | 5/2021 | Al Majid et al. |
| 11,030,454 | B1 | 6/2021 | Xiong et al. |
| 11,036,368 | B1 | 6/2021 | Al Majid et al. |
| 11,062,498 | B1 | 7/2021 | Voss et al. |
| 11,087,728 | B1 | 8/2021 | Canberk et al. |
| 11,092,998 | B1 | 8/2021 | Castañeda et al. |
| 11,106,342 | B1 | 8/2021 | Al Majid et al. |
| 11,126,206 | B2 | 9/2021 | Meisenholder et al. |
| 11,143,867 | B2 | 10/2021 | Rodriguez, II |
| 11,169,600 | B1 | 11/2021 | Canberk et al. |
| 11,227,626 | B1 | 1/2022 | Krishnan Gorumkonda et al. |
| 11,307,747 | B2 | 4/2022 | Dancie et al. |
| 11,531,402 | B1 | 12/2022 | Stolzenberg |
| 11,546,505 | B2 | 1/2023 | Canberk |
| 2009/0012788 | A1 | 1/2009 | Gilbert et al. |
| 2011/0301934 | A1 | 12/2011 | Tardif |
| 2014/0171036 | A1 | 6/2014 | Simmons |
| 2015/0120293 | A1 | 4/2015 | Wohlert et al. |
| 2015/0370320 | A1 | 12/2015 | Connor |
| 2017/0123487 | A1 | 5/2017 | Hazra et al. |
| 2017/0277684 | A1 | 9/2017 | Dharmarajan Mary |
| 2017/0277685 | A1 | 9/2017 | Takumi |
| 2017/0351910 | A1 | 12/2017 | Elwazer et al. |
| 2018/0107360 | A1* | 4/2018 | Kim .................... G06F 3/04817 |
| 2018/0158370 | A1 | 6/2018 | Pryor |
| 2018/0302568 | A1* | 10/2018 | Kim .................... H04N 23/69 |
| 2020/0267324 | A1* | 8/2020 | Liu .................... H04N 23/617 |
| 2021/0011612 | A1 | 1/2021 | Dancie et al. |
| 2021/0074016 | A1 | 3/2021 | Li et al. |
| 2021/0166732 | A1 | 6/2021 | Shaburova et al. |
| 2021/0174034 | A1 | 6/2021 | Retek et al. |
| 2021/0241529 | A1 | 8/2021 | Cowburn et al. |
| 2021/0303075 | A1 | 9/2021 | Cowburn et al. |
| 2021/0303077 | A1 | 9/2021 | Anvaripour et al. |
| 2021/0303140 | A1 | 9/2021 | Mourkogiannis |
| 2021/0382564 | A1 | 12/2021 | Blachly et al. |
| 2021/0397000 | A1 | 12/2021 | Rodriguez, II |
| 2021/0405761 | A1 | 12/2021 | Canberk |
| 2021/0406543 | A1* | 12/2021 | Drummond .......... H04W 4/021 |
| 2022/0188539 | A1 | 6/2022 | Chan et al. |
| 2022/0206588 | A1 | 6/2022 | Canberk et al. |
| 2022/0300730 | A1 | 9/2022 | Eirinberg et al. |
| 2022/0300731 | A1 | 9/2022 | Eirinberg et al. |
| 2022/0326781 | A1 | 10/2022 | Hwang et al. |
| 2022/0334649 | A1 | 10/2022 | Hwang et al. |
| 2024/0094020 | A1* | 3/2024 | Furue .................... G08G 1/005 |

FOREIGN PATENT DOCUMENTS

| | | |
|---|---|---|
| KR | 20220158824 | 12/2022 |
| WO | 2016168591 | 10/2016 |
| WO | 2019094618 | 5/2019 |
| WO | 2022005687 | 1/2022 |
| WO | 2022005693 | 1/2022 |
| WO | 2022060549 | 3/2022 |
| WO | 2022066578 | 3/2022 |
| WO | 2022132381 | 6/2022 |
| WO | 2022146678 | 7/2022 |
| WO | 2022198182 | 9/2022 |
| WO | 2022216784 | 10/2022 |
| WO | 2022225761 | 10/2022 |
| WO | 2022245765 | 11/2022 |

* cited by examiner

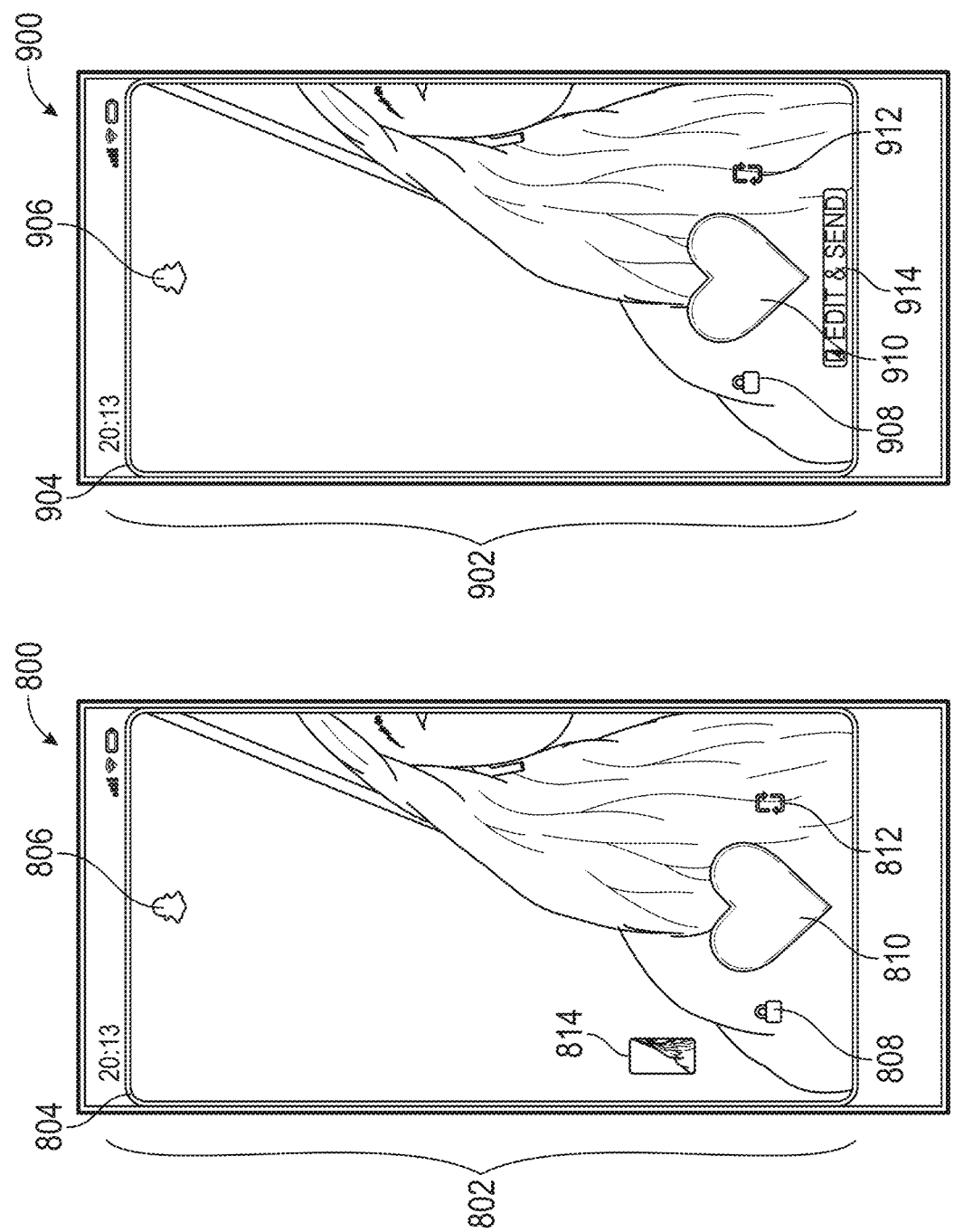

CUSTOMIZING A CAPTURE BUTTON USED DURING VIDEO RECORDING

TECHNICAL FIELD

The present disclosure relates generally to a messaging system, including customizing a capture button used during video recording.

BACKGROUND

Systems such as messaging systems provide for the exchange of message content between users. For example, such systems allow users to exchange message content (e.g., text, video, pictures) between each other.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some non-limiting examples are illustrated in the figures of the accompanying drawings in which:

FIG. 8 illustrates an example user interface for displaying a customized capture button together with a preview icon, in accordance with some examples.

FIG. 9 illustrates an example user interface for displaying a customized capture button in association with a multi-clip capture mode, in accordance with some examples.

DETAILED DESCRIPTION

Systems such as messaging systems typically allow users to exchange media content items (e.g., messages, images and/or video) with one another. As described herein, the system provides for a user to capture video, and for the user to customize interface elements that are displayed during video recording.

The disclosed embodiments relate to a system which provides selected users (e.g., users who opt into a subscription plan offered by the system) with exclusive features associated with video recording. The exclusive features include customization of a capture button, which replaces display of the shutter button during video recording. In example embodiments, the shutter button initially appears as a circle with a border (e.g., white border) and no fill. Without a customized capture button, the system defaults to updating the shutter button by scaling up the circle and changing the entire circle into a solid color (e.g., yellow). However, the selected users (e.g., subscribers to the exclusive features) are provided user interfaces for selecting a capture button, from a list of available capture buttons, for replacing display of the shutter button during video recording.

In addition, the exclusive features include customizing a border together with an animated icon used to indicate that video recording is active. In example embodiments, the border and animated icon are assigned a default color (e.g., yellow) with respect to video recording. However, the selected users are provided with user interfaces for selecting a custom color/pattern, while other users (e.g., those who did not opt into the subscription plan) are not provided with such user interfaces.

By virtue of providing for customization of a capture button, border and animated icon used to indicate video recording, the system provides increased interactive feedback and facilitates video recording. Without providing such indications, the status and progress of video recording may be difficult to determine. Thus, the system facilitates the capturing of videos, thereby saving time for the user (e.g., by reducing the number of retakes), and reducing computational resources/processing power.

Networked Computing Environment

Figure 1:
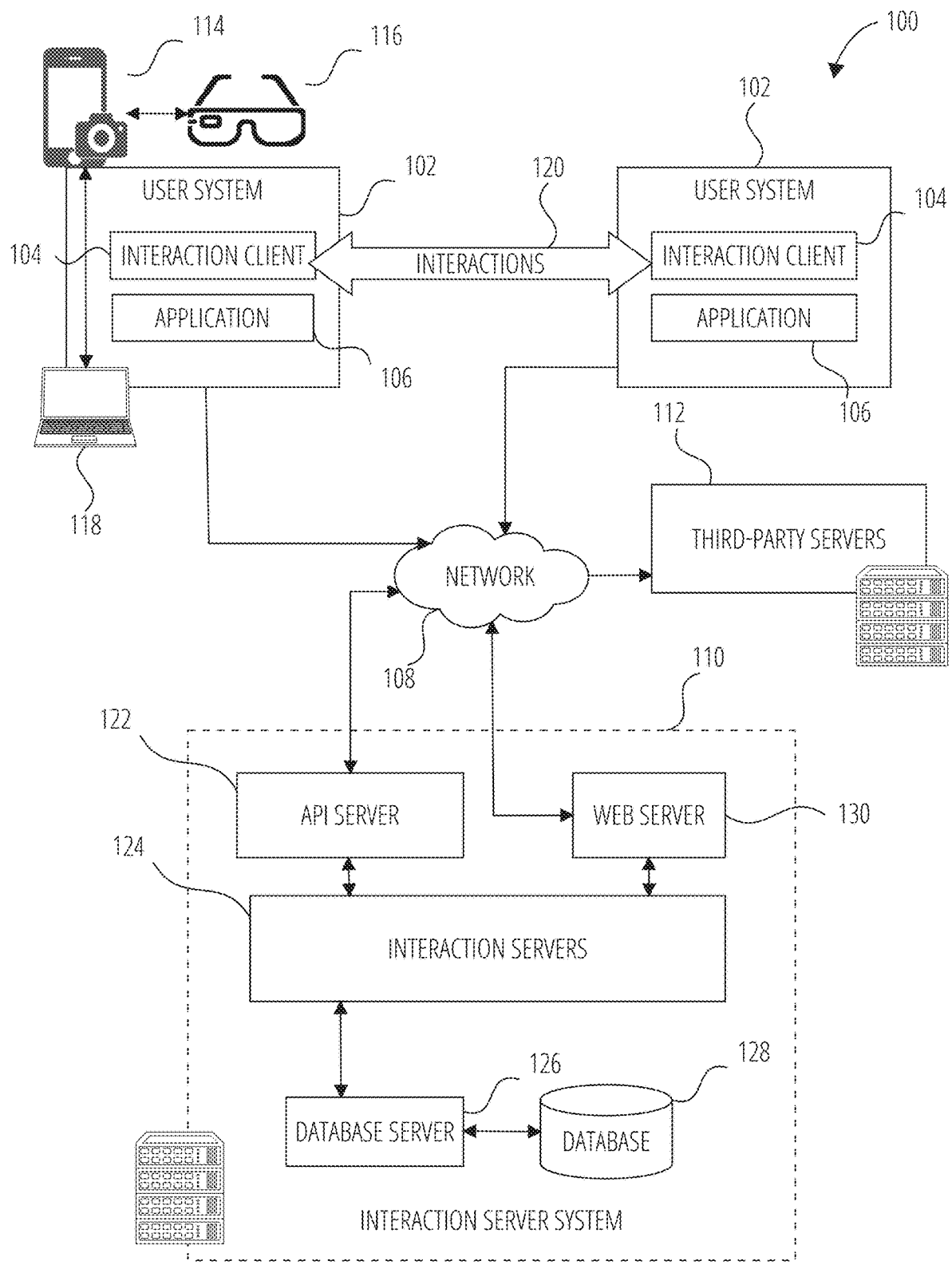
FIG. 1 is a diagrammatic representation of a networked environment in which the present disclosure may be deployed, according to some examples.

FIG. 1 is a block diagram showing an example interaction system 100 for facilitating interactions (e.g., exchanging text messages, conducting text audio and video calls, or playing games) over a network. The interaction system 100 includes multiple client systems 102, each of which hosts multiple applications, including an interaction client 104 and other applications 106. Each interaction client 104 is communicatively coupled, via one or more communication networks including a network 108 (e.g., the Internet), to other instances of the interaction client 104 (e.g., hosted on respective other user systems 102), an interaction server system 110 and third-party servers 112). An interaction client 104 can also communicate with locally hosted applications 106 using Applications Program Interfaces (APIs).

Each user system 102 may include multiple user devices, such as a mobile device 114, head-wearable apparatus 116, and a computer client device 118 that are communicatively connected to exchange data and messages.

An interaction client 104 interacts with other interaction clients 104 and with the interaction server system 110 via the network 108. The data exchanged between the interaction clients 104 (e.g., interactions 120) and between the interaction clients 104 and the interaction server system 110 includes functions (e.g., commands to invoke functions) and payload data (e.g., text, audio, video, or other multimedia data).

The interaction server system 110 provides server-side functionality via the network 108 to the interaction clients 104. While certain functions of the interaction system 100 are described herein as being performed by either an interaction client 104 or by the interaction server system 110, the location of certain functionality either within the interaction client 104 or the interaction server system 110 may be a design choice. For example, it may be technically preferable to initially deploy particular technology and functionality within the interaction server system 110 but to later migrate this technology and functionality to the interaction client 104 where a user system 102 has sufficient processing capacity.

The interaction server system 110 supports various services and operations that are provided to the interaction clients 104. Such operations include transmitting data to, receiving data from, and processing data generated by the interaction clients 104. This data may include message content, client device information, geolocation information, media augmentation and overlays, message content persistence conditions, social network information, and live event information. Data exchanges within the interaction system 100 are invoked and controlled through functions available via user interfaces (UIs) of the interaction clients 104.

Turning now specifically to the interaction server system 110, an Application Program Interface (API) server 122 is coupled to and provides programmatic interfaces to interaction servers 124, making the functions of the interaction servers 124 accessible to interaction clients 104, other applications 106 and third-party server 112. The interaction servers 124 are communicatively coupled to a database server 126, facilitating access to a database 128 that stores data associated with interactions processed by the interaction servers 124. Similarly, a web server 130 is coupled to the interaction servers 124 and provides web-based interfaces to the interaction servers 124. To this end, the web server 130 processes incoming network requests over the Hypertext Transfer Protocol (HTTP) and several other related protocols.

The Application Program Interface (API) server 122 receives and transmits interaction data (e.g., commands and message payloads) between the interaction servers 124 and the client systems 102 (and, for example, interaction clients 104 and other application 106) and the third-party server 112. Specifically, the Application Program Interface (API) server 122 provides a set of interfaces (e.g., routines and protocols) that can be called or queried by the interaction client 104 and other applications 106 to invoke functionality of the interaction servers 124. The Application Program Interface (API) server 122 exposes various functions supported by the interaction servers 124, including account registration; login functionality, the sending of interaction data, via the interaction servers 124, from a particular interaction client 104 to another interaction client 104; the communication of media files (e.g., images or video) from an interaction client 104 to the interaction servers 124; the settings of a collection of media data (e.g., a story); the retrieval of a list of friends of a user of a user system 102; the retrieval of messages and content; the addition and deletion of entities (e.g., friends) to an entity graph (e.g., a social graph); the location of friends within a social graph; and opening an application event (e.g., relating to the interaction client 104).

The interaction servers 124 host multiple systems and subsystems, described below with reference to FIG. 2.

System Architecture

Figure 2:
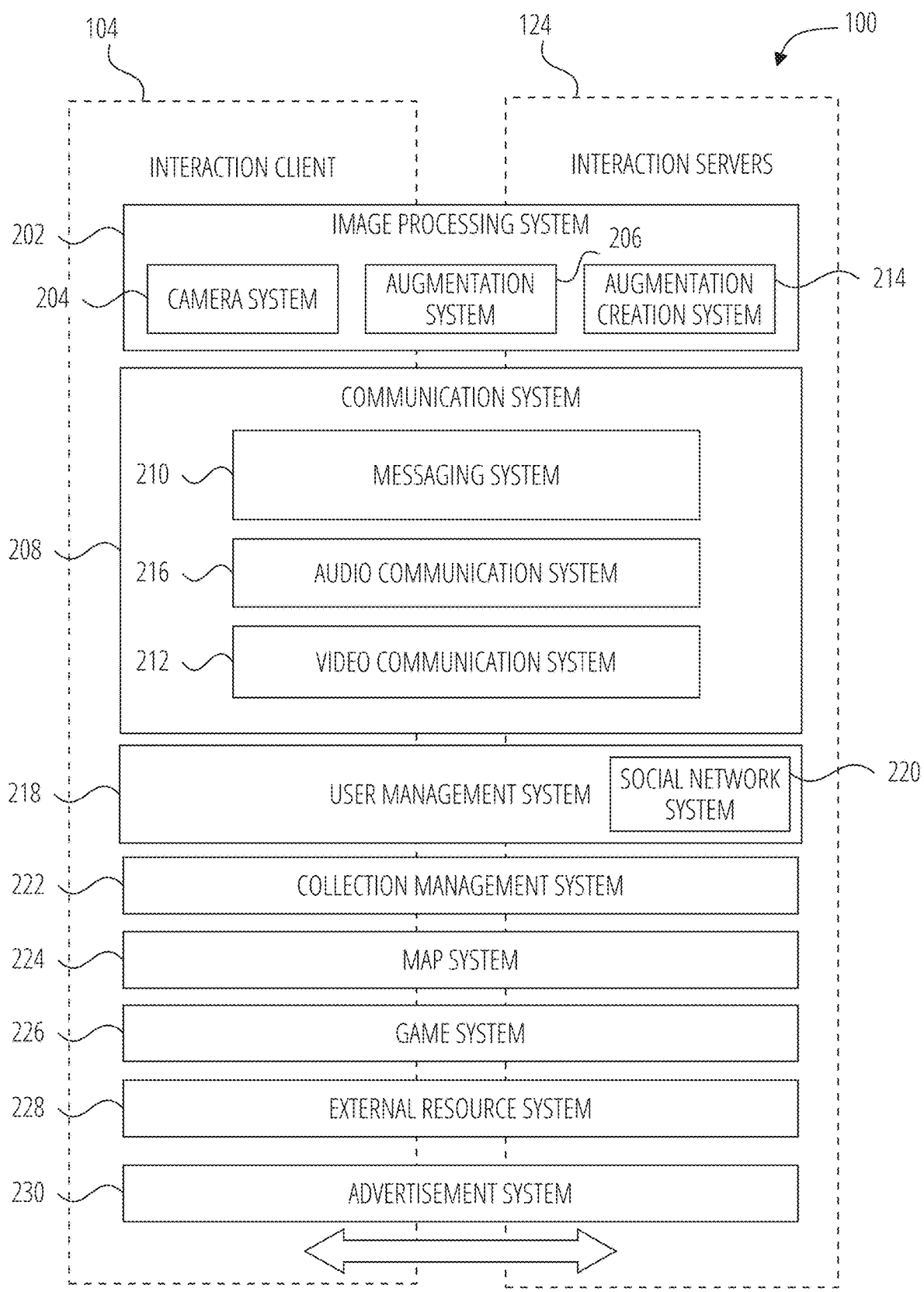
FIG. 2 is a diagrammatic representation of a messaging system, according to some examples, that has both client-side and server-side functionality.

FIG. 2 is a block diagram illustrating further details regarding the interaction system 100, according to some examples. Specifically, the interaction system 100 is shown to comprise the interaction client 104 and the interaction servers 124. The interaction system 100 embodies multiple subsystems, which are supported on the client-side by the interaction client 104 and on the server-side by the interaction servers 124. Example subsystems are discussed below.

An image processing system 202 provides various functions that enable a user to capture and augment (e.g., annotate or otherwise modify or edit) media content associated with a message.

A camera system 204 includes control software (e.g., in a camera application) that interacts with and controls hardware camera hardware (e.g., directly or via operating system controls) of the user system 102 to modify and augment real-time images captured and displayed via the interaction client 104.

The augmentation system 206 provides functions related to the generation and publishing of augmentations (e.g., media overlays) for images captured in real-time by cameras of the user system 102 or retrieved from memory of the user system 102. For example, the augmentation system 206 operatively selects, presents, and displays media overlays (e.g., an image filter or an image lens) to the interaction client 104 for the augmentation of real-time images received via the camera system 204 or stored images retrieved from memory of the user system 102. These augmentations are selected by the augmentation system 206 and presented to a user of an interaction client 104, based on a number of inputs and data, such as for example:

Geolocation of the user system 102; and
Social network information of the user of the user system 102.

An augmentation may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo or video) at user system 102 for communication in a message, or applied to video content, such as a video content stream or feed transmitted from an interaction client 104. As such, the image processing system 202 may interact with, and support, the various subsystems of the communication system 208, such as the messaging system 210 and the video communication system 212.

A media overlay may include text or image data that can be overlaid on top of a photograph taken by the user system 102 or a video stream produced by the user system 102. In some examples, the media overlay may be a location overlay (e.g., Venice beach), a name of a live event, or a name of a merchant overlay (e.g., Beach Coffee House). In further examples, the image processing system 202 uses the geolocation of the user system 102 to identify a media overlay that includes the name of a merchant at the geolocation of the user system 102. The media overlay may include other indicia associated with the merchant. The media overlays may be stored in the databases 128 and accessed through the database server 126.

The image processing system 202 provides a user-based publication platform that enables users to select a geolocation on a map and upload content associated with the selected geolocation. The user may also specify circumstances under which a particular media overlay should be offered to other users. The image processing system 202 generates a media overlay that includes the uploaded content and associates the uploaded content with the selected geolocation.

The augmentation creation system 214 supports augmented reality developer platforms and includes an application for content creators (e.g., artists and developers) to create and publish augmentations (e.g., augmented reality experiences) of the interaction client 104. The augmentation creation system 214 provides a library of built-in features and tools to content creators including, for example custom shaders, tracking technology, and templates.

In some examples, the augmentation creation system 214 provides a merchant-based publication platform that enables merchants to select a particular augmentation associated with a geolocation via a bidding process. For example, the augmentation creation system 214 associates a media overlay of the highest bidding merchant with a corresponding geolocation for a predefined amount of time.

A communication system 208 is responsible for enabling and processing multiple forms of communication and interaction within the interaction system 100 and includes a messaging system 210, an audio communication system 216, and a video communication system 212. The messaging system 210 is responsible for enforcing the temporary or time-limited access to content by the interaction clients 104. The audio communication system 216 enables and supports audio communications (e.g., real-time audio chat) between multiple interaction clients 104. Similarly, the video communication system 212 enables and supports video communications (e.g., real-time video chat) between multiple interaction clients 104.

A user management system 218 is operationally responsible for the management of user data and profiles, and includes a social network system 220 that maintains information regarding relationships between users of the interaction system 100.

A collection management system 222 is operationally responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 222 may also be responsible for publishing an icon that provides notification of a particular collection to the user interface of the interaction client 104. The collection management system 222 includes a curation function that allows a collection manager to manage and curate a particular collection of content. For example, the curation interface enables an event organizer to curate a collection of content relating to a specific event (e.g., delete inappropriate content or redundant messages). Additionally, the collection management system 222 employs machine vision (or image recognition technology) and content rules to curate a content collection automatically. In certain examples, compensation may be paid to a user to include user-generated content into a collection. In such cases, the collection management system 222 operates to automatically make payments to such users to use their content.

A map system 224 provides various geographic location functions and supports the presentation of map-based media content and messages by the interaction client 104. For example, the map system 224 enables the display of user icons or avatars (e.g., stored in profile data 302) on a map to indicate a current or past location of "friends" of a user, as well as media content (e.g., collections of messages including photographs and videos) generated by such friends, within the context of a map. For example, a message posted by a user to the interaction system 100 from a specific geographic location may be displayed within the context of a map at that particular location to "friends" of a specific user on a map interface of the interaction client 104. A user can furthermore share his or her location and status information (e.g., using an appropriate status avatar) with other users of the interaction system 100 via the interaction client 104, with this location and status information being similarly displayed within the context of a map interface of the interaction client 104 to selected users.

A game system 226 provides various gaming functions within the context of the interaction client 104. The interaction client 104 provides a game interface providing a list of available games that can be launched by a user within the context of the interaction client 104 and played with other users of the interaction system 100. The interaction system 100 further enables a particular user to invite other users to participate in the play of a specific game by issuing invitations to such other users from the interaction client 104. The interaction client 104 also supports audio, video, and text messaging (e.g., chats) within the context of gameplay, provides a leaderboard for the games, and also supports the provision of in-game rewards (e.g., coins and items).

An external resource system 228 provides an interface for the interaction client 104 to communicate with remote servers (e.g., third-party servers 112) to launch or access external resources, i.e., applications or applets. Each third-party server 112 hosts, for example, a markup language (e.g., HTML5) based application or a small-scale version of an application (e.g., game, utility, payment, or ride-sharing application). The interaction client 104 may launch a web-based resource (e.g., application) by accessing the HTML5 file from the third-party servers 112 associated with the web-based resource. Applications hosted by third-party servers 112 are programmed in JavaScript leveraging a Software Development Kit (SDK) provided by the interaction servers 124. The SDK includes Application Programming Interfaces (APIs) with functions that can be called or invoked by the web-based application. The interaction servers 124 host a JavaScript library that provides a given external resource access to specific user data of the interaction client 104. HTML5 is an example of technology for programming games, but applications and resources programmed based on other technologies can be used.

To integrate the functions of the SDK into the web-based resource, the SDK is downloaded by the third-party server 112 from the interaction servers 124 or is otherwise received by the third-party server 112. Once downloaded or received, the SDK is included as part of the application code of a web-based external resource. The code of the web-based resource can then call or invoke certain functions of the SDK to integrate features of the interaction client 104 into the web-based resource.

The SDK stored on the interaction server system 110 effectively provides the bridge between an external resource (e.g., applications 106 or applets) and the interaction client 104. This gives the user a seamless experience of communicating with other users on the interaction client 104 while also preserving the look and feel of the interaction client 104. To bridge communications between an external resource and an interaction client 104, the SDK facilitates communication between third-party servers 112 and the interaction client 104. A WebViewJavaScriptBridge running on a user system 102 establishes two one-way communication channels between an external resource and the interaction client 104. Messages are sent between the external resource and the interaction client 104 via these communication channels asynchronously. Each SDK function invocation is sent as a message and callback. Each SDK function is implemented by constructing a unique callback identifier and sending a message with that callback identifier.

By using the SDK, not all information from the interaction client 104 is shared with third-party servers 112. The SDK limits which information is shared based on the needs of the external resource. Each third-party server 112 provides an HTML5 file corresponding to the web-based external resource to interaction servers 124. The interaction servers 124 can add a visual representation (such as a box art or other graphic) of the web-based external resource in the interaction client 104. Once the user selects the visual representation or instructs the interaction client 104 through a GUI of the interaction client 104 to access features of the web-based external resource, the interaction client 104 obtains the HTML5 file and instantiates the resources to access the features of the web-based external resource.

The interaction client 104 presents a graphical user interface (e.g., a landing page or title screen) for an external resource. During, before, or after presenting the landing page or title screen, the interaction client 104 determines whether the launched external resource has been previously authorized to access user data of the interaction client 104. In response to determining that the launched external resource has been previously authorized to access user data of the interaction client 104, the interaction client 104 presents another graphical user interface of the external resource that includes functions and features of the external resource. In response to determining that the launched external resource has not been previously authorized to access user data of the interaction client 104, after a threshold period of time (e.g., 3 seconds) of displaying the landing page or title screen of the external resource, the interaction client 104 slides up (e.g., animates a menu as surfacing from a bottom of the screen to a middle or other portion of the screen) a menu for authorizing the external resource to access the user data. The menu identifies the type of user data that the external resource will be authorized to use. In response to receiving a user selection of an accept option, the interaction client 104 adds the external resource to a list of authorized external resources and allows the external resource to access user data from the interaction client 104. The external resource is authorized by the interaction client 104 to access the user data under an OAuth 2 framework.

The interaction client 104 controls the type of user data that is shared with external resources based on the type of external resource being authorized. For example, external resources that include full-scale applications (e.g., an application 106) are provided with access to a first type of user data (e.g., two-dimensional avatars of users with or without different avatar characteristics). As another example, external resources that include small-scale versions of applications (e.g., web-based versions of applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

An advertisement system 230 operationally enables the purchasing of advertisements by third parties for presentation to end-users via the interaction clients 104 and also handles the delivery and presentation of these advertisements.

Data Architecture

Figure 3:
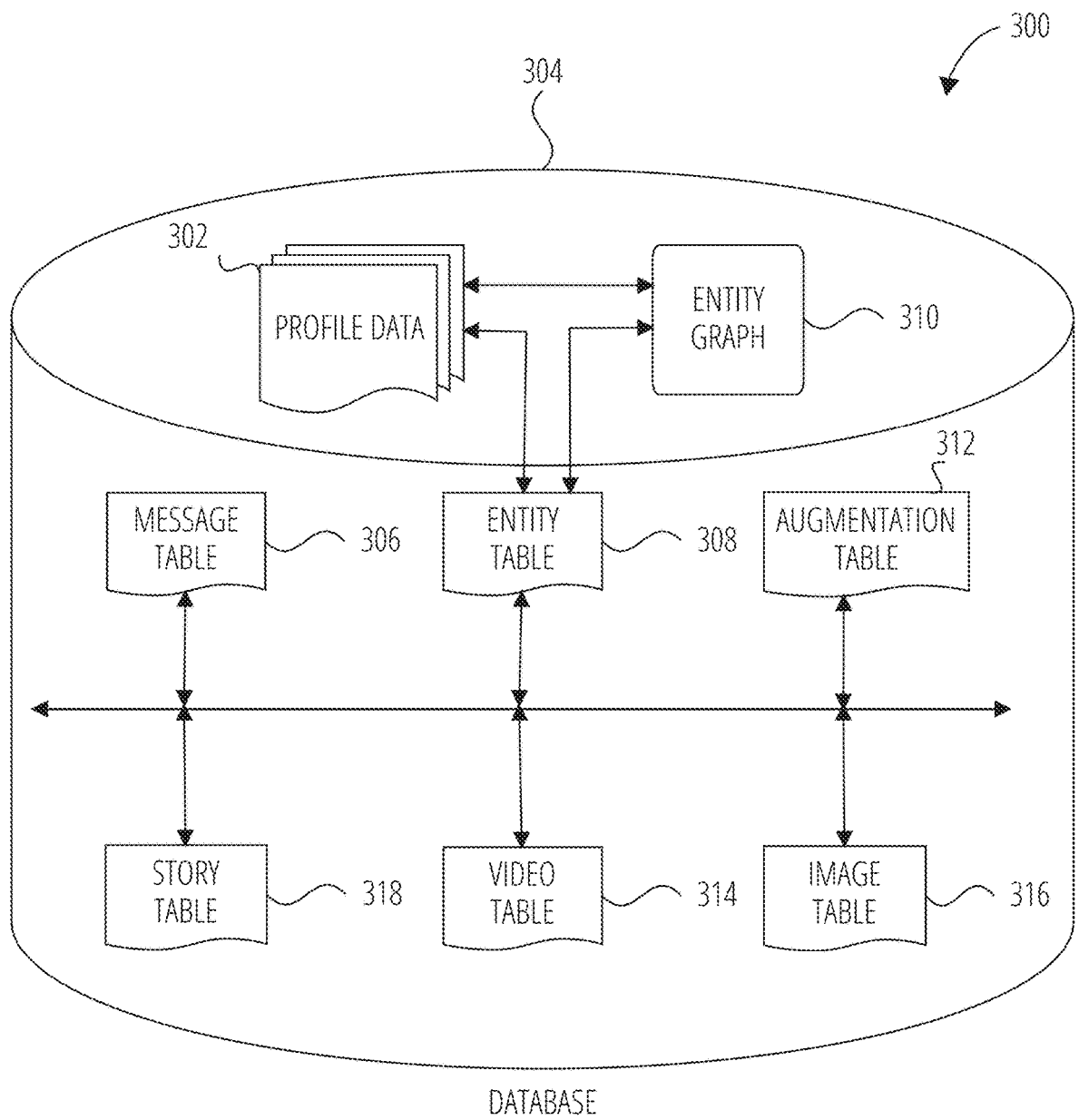
FIG. 3 is a diagrammatic representation of a data structure as maintained in a database, according to some examples.

FIG. 3 is a schematic diagram illustrating data structures 300, which may be stored in the database 304 of the interaction server system 110, according to certain examples. While the content of the database 304 is shown to comprise multiple tables, it will be appreciated that the data could be stored in other types of data structures (e.g., as an object-oriented database).

The database 304 includes message data stored within a message table 306. This message data includes, for any particular message, at least message sender data, message recipient (or receiver) data, and a payload. Further details regarding information that may be included in a message, and included within the message data stored in the message table 306, are described below with reference to FIG. 3.

An entity table 308 stores entity data, and is linked (e.g., referentially) to an entity graph 310 and profile data 302. Entities for which records are maintained within the entity table 308 may include individuals, corporate entities, organizations, objects, places, events, and so forth. Regardless of entity type, any entity regarding which the interaction server system 110 stores data may be a recognized entity. Each entity is provided with a unique identifier, as well as an entity type identifier (not shown).

The entity graph 310 stores information regarding relationships and associations between entities. Such relationships may be social, professional (e.g., work at a common corporation or organization), interest-based, or activity-based, merely for example. Certain relationships between entities may be unidirectional, such as a subscription by an individual user to digital content of a commercial or publishing user (e.g., a newspaper or other digital media outlet, or a brand). Other relationships may be bidirectional, such as a "friend" relationship between individual users of the interaction system 100.

Certain permissions and relationships may be attached to each relationship, and also to each direction of a relationship. For example, a bidirectional relationship (e.g., a friend relationship between individual users) may include authorization for the publication of digital content items between the individual users, but may impose certain restrictions or filters on the publication of such digital content items (e.g., based on content characteristics, location data or time of day data). Similarly, a subscription relationship between an individual user and a commercial user may impose different degrees of restrictions on the publication of digital content from the commercial user to the individual user, and may significantly restrict or block the publication of digital content from the individual user to the commercial user. A particular user, as an example of an entity, may record certain restrictions (e.g., by way of privacy settings) in a record for that entity within the entity table 308. Such privacy settings may be applied to all types of relationships within the context of the interaction system 100, or may selectively be applied to certain types of relationships.

The profile data 302 stores multiple types of profile data about a particular entity. The profile data 302 may be selectively used and presented to other users of the interaction system 100 based on privacy settings specified by a particular entity. Where the entity is an individual, the profile data 302 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the interaction system 100, and on map interfaces displayed by interaction clients 104 to other users. The collection of avatar representations may include "status avatars," which present a graphical representation of a status or activity that the user may select to communicate at a particular time.

Where the entity is a group, the profile data 302 for the group may similarly include one or more avatar representations associated with the group, in addition to the group name, members, and various settings (e.g., notifications) for the relevant group.

The database 304 also stores augmentation data, such as overlays or filters, in an augmentation table 312. The augmentation data is associated with and applied to videos (for which data is stored in a video table 314) and images (for which data is stored in an image table 316).

Filters, in some examples, are overlays that are displayed as overlaid on an image or video during presentation to a recipient user. Filters may be of various types, including user-selected filters from a set of filters presented to a sending user by the interaction client 104 when the sending user is composing a message. Other types of filters include geolocation filters (also known as geo-filters), which may be presented to a sending user based on geographic location. For example, geolocation filters specific to a neighborhood or special location may be presented within a user interface by the interaction client 104, based on geolocation information determined by a Global Positioning System (GPS) unit of the user system 102.

Another type of filter is a data filter, which may be selectively presented to a sending user by the interaction client 104 based on other inputs or information gathered by the user system 102 during the message creation process. Examples of data filters include current temperature at a specific location, a current speed at which a sending user is traveling, battery life for a user system 102, or the current time.

Other augmentation data that may be stored within the image table 316 includes augmented reality content items (e.g., corresponding to applying "lenses" or augmented reality experiences). An augmented reality content item may be a real-time special effect and sound that may be added to an image or a video.

A story table 318 stores data regarding collections of messages and associated image, video, or audio data, which are compiled into a collection (e.g., a story or a gallery). The creation of a particular collection may be initiated by a particular user (e.g., each user for which a record is maintained in the entity table 308). A user may create a "personal story" in the form of a collection of content that has been created and sent/broadcast by that user. To this end, the user interface of the interaction client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the interaction client 104, to contribute content to a particular live story. The live story may be identified to the user by the interaction client 104, based on his or her location. The end result is a "live story" told from a community perspective.

A further type of content collection is known as a "location story," which enables a user whose user system 102 is located within a specific geographic location (e.g., on a college or university campus) to contribute to a particular collection. In some examples, a contribution to a location story may employ a second degree of authentication to verify that the end-user belongs to a specific organization or other entity (e.g., is a student on the university campus).

As mentioned above, the video table 314 stores video data that, in some examples, is associated with messages for which records are maintained within the message table 306. Similarly, the image table 316 stores image data associated with messages for which message data is stored in the entity table 308. The entity table 308 may associate various augmentations from the augmentation table 312 with various images and videos stored in the image table 316 and the video table 314.

Data Communications Architecture

Figure 4:
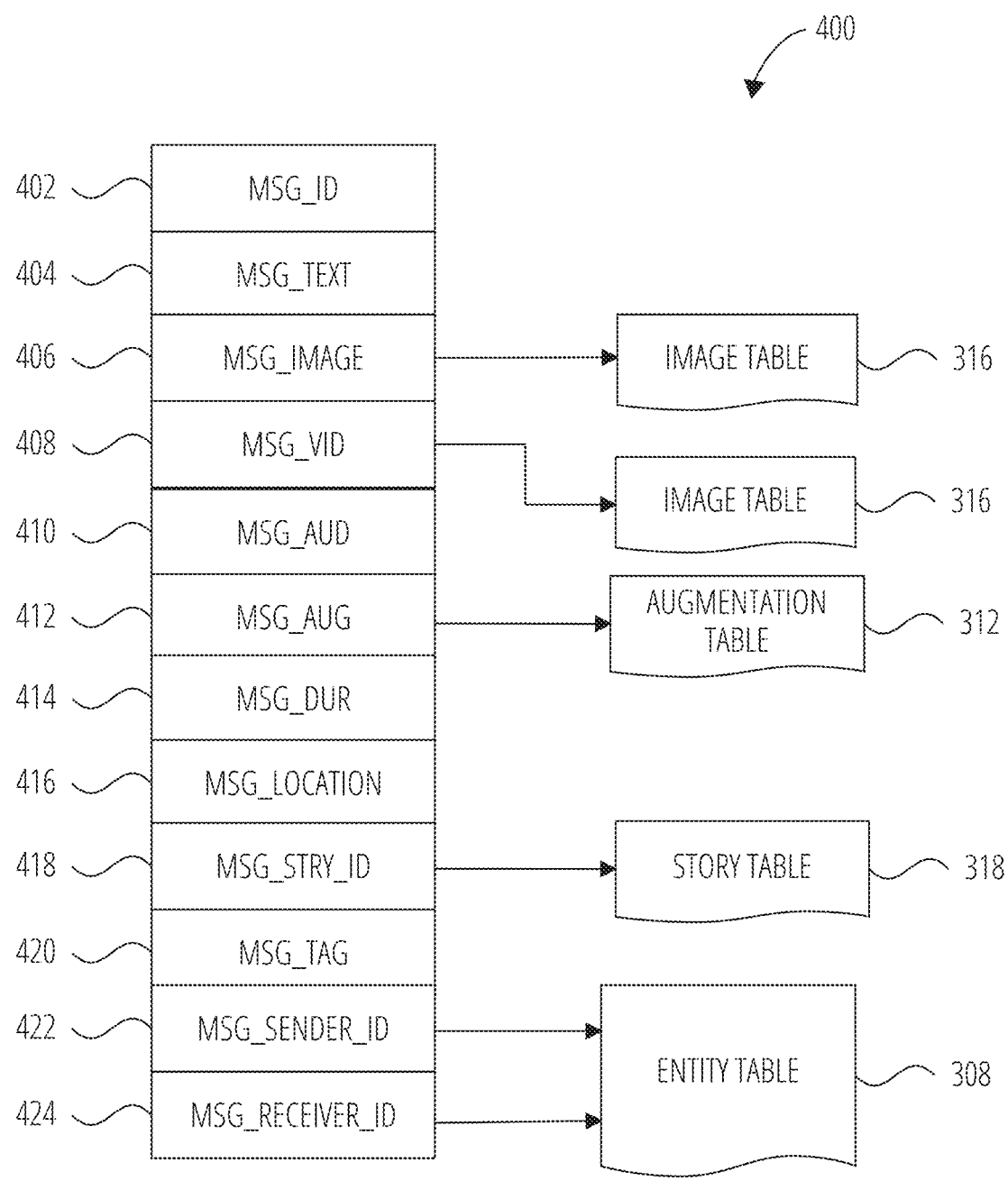
FIG. 4 is a diagrammatic representation of a message, according to some examples.

FIG. 4 is a schematic diagram illustrating a structure of a message 400, according to some examples, generated by an interaction client 104 for communication to a further interaction client 104 via the interaction servers 124. The content of a particular message 400 is used to populate the message table 306 stored within the database 304, accessible by the interaction servers 124. Similarly, the content of a message 400 is stored in memory as "in-transit" or "in-flight" data of the user system 102 or the interaction servers 124. A message 400 is shown to include the following example components:

Message identifier 402: a unique identifier that identifies the message 400.

Message text payload 404: text, to be generated by a user via a user interface of the user system 102, and that is included in the message 400.

Message image payload 406: image data, captured by a camera component of a user system 102 or retrieved from a memory component of a user system 102, and that is included in the message 400. Image data for a sent or received message 400 may be stored in the image table 316.

Message video payload 408: video data, captured by a camera component or retrieved from a memory component of the user system 102, and that is included in the message 400. Video data for a sent or received message 400 may be stored in the image table 316.

Message audio payload 410: audio data, captured by a microphone or retrieved from a memory component of the user system 102, and that is included in the message 400.

Message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 312.

Message duration parameter 414: parameter value indicating, in seconds, the amount of time for which content of the message (e.g., the message image payload 406, message video payload 408, message audio payload 410) is to be presented or made accessible to a user via the interaction client 104.

Message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image within the message image payload 406, or a specific video in the message video payload 408).

Message story identifier 418: identifier values identifying one or more content collections (e.g., "stories" identified in the story table 318) with which a particular content item in the message image payload 406 of the message 400 is associated. For example, multiple images within the message image payload 406 may each be associated with multiple content collections using identifier values.

Message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

Message sender identifier 422: an identifier (e.g., a messaging system identifier, email address, or device identifier) indicative of a user of the user system 102 on which the message 400 was generated and from which the message 400 was sent.

Message receiver identifier 424: an identifier (e.g., a messaging system identifier, email address, or device identifier) indicative of a user of the user system 102 to which the message 400 is addressed.

The contents (e.g., values) of the various components of message 400 may be pointers to locations in tables within which content data values are stored. For example, an image value in the message image payload 406 may be a pointer to (or address of) a location within an image table 316. Similarly, values within the message video payload 408 may point to data stored within an image table 316, values stored within the message augmentation data 412 may point to data stored in an augmentation table 312, values stored within the message story identifier 418 may point to data stored in a story table 318, and values stored within the message sender identifier 422 and the message receiver identifier 424 may point to user records stored within an entity table 308.

Figure 5:
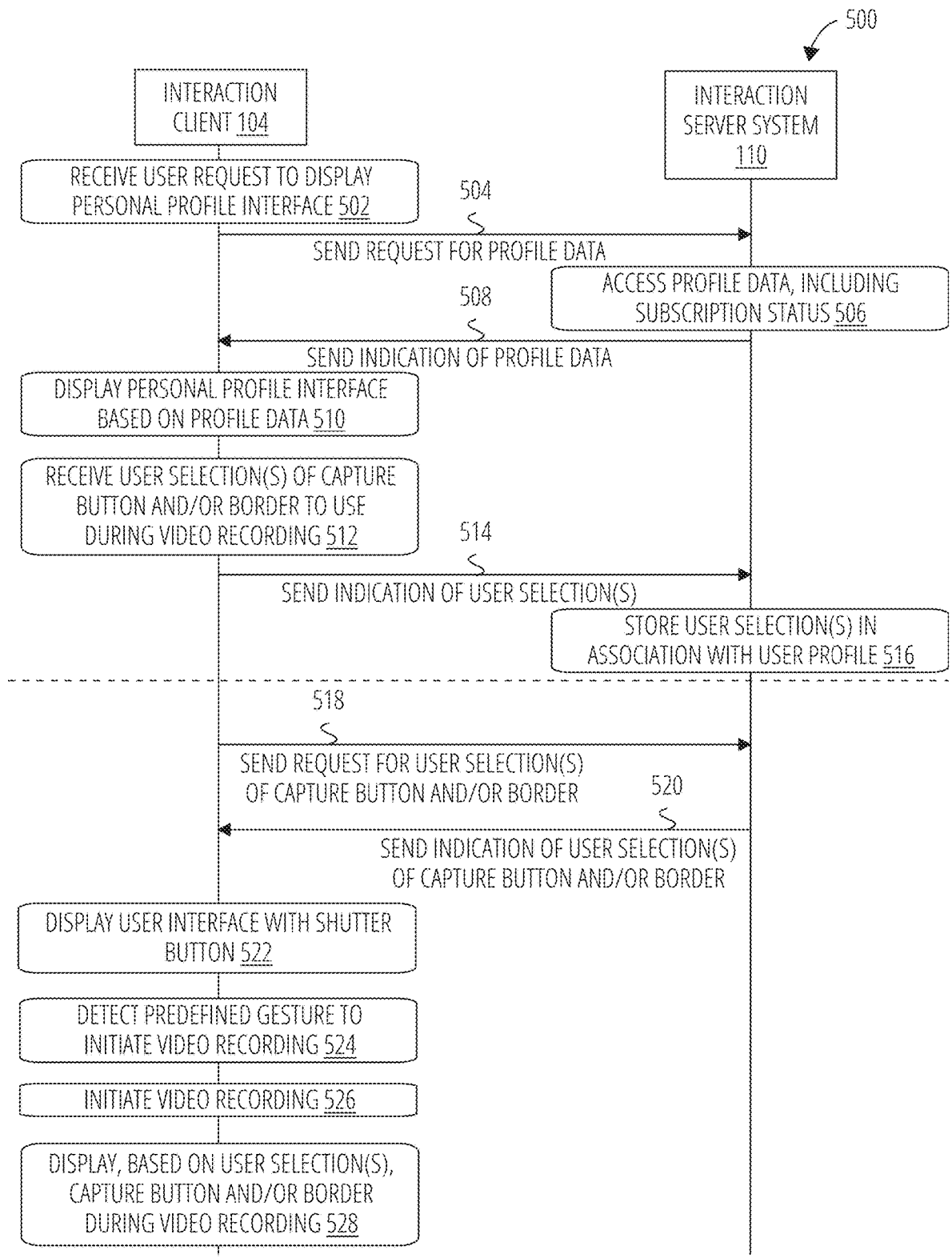
FIG. 5 is an interaction diagram illustrating a process for customizing a capture button, in accordance with some examples.

FIG. 5 is an interaction diagram illustrating a process 500 for customizing a capture button, in accordance with some examples. For explanatory purposes, the process 500 is primarily described herein with reference to the interaction client 104 and the interaction server system 110 of FIG. 1. However, one or more blocks (or operations) of the process 500 may be performed by one or more other components, and/or by other suitable devices. Further for explanatory purposes, the blocks (or operations) of the process 500 are described herein as occurring in serial, or linearly. However, multiple blocks (or operations) of the process 500 may occur in parallel or concurrently. In addition, the blocks (or operations) of the process 500 need not be performed in the order shown and/or one or more blocks (or operations) of the process 500 need not be performed and/or can be replaced by other operations. The process 500 may be terminated when its operations are completed. In addition, the process 500 may correspond to a method, a procedure, an algorithm, etc.

In one or more embodiments, the interaction client 104 is running on a user system 102 associated with a user of the interaction system 100. The user is associated with a user account of the interaction system 100 in conjunction with the user management system 218. For example, the user is identified by the user management system 218 based on one or more unique identifiers (e.g., a messaging system identifier, email address and/or a device identifier) associated with the user accounts for the user. In some embodiments, the user management system 218 implements and/or works in conjunction with the social network system 220 which is configured to identify other users (e.g., friends) with which the user of the interaction client 104 has relationships.

As described herein, the interaction client 104 provides selected users with exclusive features associated with video recording. The selected users correspond to those who opt into a subscription plan offered by the interaction system 100. The exclusive features include customization of a capture button, which replaces display of the shutter button during recording. In example embodiments, the shutter button initially appears as a circle with a border (e.g., white border) and no fill. Without a customized capture button, the interaction client 104 defaults to updating the shutter button by scaling up the circle and changing the entire circle into a solid color (e.g., yellow). However, the selected users (e.g, subscribers to the exclusive features) are provided user interfaces for selecting a capture button, from a list of custom available buttons, for replacing display of the shutter button during video recording.

In addition, the exclusive features include customizing a border together with an animated icon used to indicate that video recording is active. In example embodiments, the border and animated icon are assigned a default color (e.g., yellow) with respect to video recording. However, the selected users are provided with user interfaces for selecting a custom color/pattern, while other users (e.g., those who did not opt into the subscription plan) are not provided with such user interfaces.

In the example of FIG. 5, operations 502-516 correspond to a first phase which relates to user selection of a customized capture button and/or border. Moreover, operations 518-528 correspond to a second phase which relates to displaying the customized capture button and/or border during video recording. It may be understood that the second phase may occur shortly after the first phase, or after an extended period of time after the first phase. As such, FIG. 5 includes a dashed line separating the first phase and the second phase for illustrative purposes.

At block 502, the interaction client 104 receives a user request to display a personal profile interface. In example embodiments, the interaction client 104 initially displays a camera interface upon startup (e.g., the user interface 702 of FIG. 7A, discussed below). The camera interface includes various interface elements, including a profile button which is user-selectable to surface the personal profile interface. Thus, the user request at block 502 corresponds to user selection of the profile button.

In response, the interaction client 104 sends a request for profile data to the interaction server system 110 (operation 504). As noted above, profile data for a user includes one or more of the user name, telephone number, address, friends (e.g., contacts) of the end user, personal avatar(s) of the user, and/or subscription status (e.g., whether or not the end user opted into the subscription plan).

The interaction server system 110 accesses the profile data of the user (e.g., via the profile data 302 in the database 304), including the subscription status (block 506). The interaction server system 110 sends an indication of the profile data to the interaction client 104 (operation 508).

Based on the profile data received from the interaction server system 110, the interaction client 104 displays the personal profile interface for the end user (block 510). For example, the personal profile interface presents one or more of the user name, telephone number, address, friends (e.g., contacts) and/or personal avatar(s). For the selected users opting into the subscription plan, the personal profile interface provides user-selectable interface elements for accessing exclusive features, such as customized user interfaces. For example, the end user may select to customize the capture button and/or border with animated icon used to indicate video recording.

As discussed further below with respect to FIG. 6D, the personal profile interface includes an interface element that is user-selectable to display a list of available capture buttons. For example, the list of available capture buttons is predetermined by an administrator of the interaction system 100. In example embodiments, the list of available capture buttons includes animated icon(s) which appear animated within the list. The interaction client 104 provides for the user to select a capture button from among the available capture buttons, thereby providing the user with a customized capture button.

As discussed further below with respect to FIG. 6E, the personal profile interface includes an interface element that is user-selectable to display a list of available borders. The list of available borders is predetermined by the administrator of the interaction system 100. The interaction client 104 provides for the user to a select border from among the available borders, thereby providing the user with a customized border. For example, the available border include different solid colors, patterns, or combinations thereof. In example embodiments, the selection of the border also applies to an animated icon. Thus, the border style (e.g., color, pattern, etc.) selected by the user applies to both the border and to the animated icon during video recording.

In the example of FIG. 5, the interaction client 104 receives user selection of a capture button via the list of available capture buttons and/or user selection of a border via the list of available borders (block 512). The interaction client 104 sends an indication of those user selection(s) to the interaction server system 110 (operation 514). For example, the indication includes a capture button identifier that uniquely identifies the user-selected capture button style (e.g., image, animation) and/or a border identifier that uniquely identifies the user-selected border/animated icon style (e.g., color, pattern).

At block 516, the interaction server system 110 stores the indication of the user selection(s) in association with the user profile (e.g., as part of the end user's profile data 302). For example, the interaction server system 110 is configured to store an indication of the user-selected capture button, such that the customized capture button persists across different sessions with respect to the interaction client 104. Moreover, the interaction server system 110 is configured to store an indication of the user-selected border and animated icon, such that the customized border and animated icon persist across different sessions with respect to the interaction client 104.

As noted above, operations 518-520 are included within a second phase which may occur shortly after the first phase, or an extended time after the first phase. It is noted that the example of FIG. 5 illustrates a scenario in which the second phase occurs an extended time after the first phase (e.g., in a separate session). Thus, at operation 518, the interaction client 104 sends a request for the user selection(s) of the capture button and border to the interaction server system 110. In response, the interaction server system 110 sends an indication of such user selection(s) to the interaction client 104 (operation 520). In a case where the second phase occurs shortly after the first phase (e.g., in the same session), the interaction client 104 may already have an indication of the user selection(s) available in local memory, and forego operations 518-520.

At block 522, the interaction client 104 displays a user interface (e.g., the camera interface) in which the camera is activated. The user interface includes image data as captured by the camera in real-time, as well as a shutter button.

In example embodiments, the user interface includes a first set of interface elements in conjunction with the real-time image data. By way of non-limiting example, the first set of interface elements includes one or more of: a profile button for surfacing a user profile (e.g., as discussed above in association with block 502), a search button for performing various types of searches with respect to the interaction system 100, a memories button for accessing saved media content items, a carousel interface launch button for surfacing a carousel interface for augmented reality content, a toolbar for activating a flash for the camera or for switching between front and rear facing cameras, or a tab bar for navigating between tabs of the interaction client 104.

In a case where the user selects the carousel interface launch button, the interaction client 104 updates the user interface to include a carousel interface. The carousel interface allows the user to cycle through and/or select different augmented reality content items, represented by respective icons, to apply with respect to the captured image data. Each augmented reality content item provides for adding a real-time special effect and/or sound to the captured image data.

In a case where no augmented reality content item is selected, the shutter button appears in a default state. For example, the shutter button appears as a circle with a border (e.g., white border) and no fill. Otherwise, the shutter button includes the respective icon, representing the currently-selected augmented reality content item, centered within the circle.

The shutter button is user-selectable to take a picture (e.g., in response to a press/tap gesture) or to record a video (e.g., in response to a press-and-hold gesture) of the image data captured by the camera. In case an augmented reality content item is selected, the picture or video is modified to include corresponding augmented reality content (e.g., a real-time special effect and/or sound). After completion of the picture or recording the video, the interaction client 104 directs to a message preview interface for generating a media content item (e.g., corresponding to the picture or video with augmented reality content, if applicable), for example, to send to friends, include in a Story, and the like.

In the example of FIG. 5, the interaction client 104 at block 524 detects a predefined gesture to initiate video recording (e.g., a press-and-hold of the shutter button). For example, the interaction client 104 detects the press-and-hold gesture via appropriate API calls with an operating system of the user system 102. The press-and-hold gesture is detectable by the operating system based on a user touching and holding the shutter button for at least a threshold period of time (e.g., ≥0.5 seconds). On the other hand, a tap gesture (e.g., for taking a photo) is detectable by the operating system based on the user touching shutter button for less than the threshold period of time (e.g., <0.5 seconds).

In response to detecting the press-and-hold gesture, the interaction client 104 causes the user system 102 to initiate video recording (block 526). As noted above, the video recording is based on the real-time image data that is captured and displayed on the user system 102 (e.g., together with augmented reality content, if applicable).

At block 528, the interaction client 104 displays, based on the user selection(s), the customized capture button and/or border with animated icon during video recording. In displaying a customized capture button, the interaction client 104 replaces display of the shutter button with display of the capture button. The selected capture button is displayed for the duration of video recording (e.g., the duration of the press-and-hold gesture). In a case where the capture button is animated, the user interface displays the corresponding animations for the duration of video recording.

If the user did not customize the capture button (not shown), the interaction client 104 updates the appearance of the shutter button by scaling up the circle (e.g., white) and changing the entire circle into a solid color (e.g., yellow). In a case where an augmented reality content item is selected, updating the appearance of the shutter button includes scaling up the circle, changing the entire circle into the solid color (e.g., yellow), and maintaining the icon representing the augmented reality content item centered within the circle on top of the solid color. The interaction client 104 updates the shutter button in this manner for the duration of the video recording.

In addition to updating the shutter button, the interaction client 104 at block 528 displays the border and animated icon to indicate that video recording is active. In displaying the customized border and animated icon, the user interface interaction client 104 presents the customized border and animated icon for the duration of video recording. If the user did not customize the border (not shown), the interaction client 104 presents the border and animated icon in a default manner (e.g., yellow) for the duration of video recording.

In example embodiments, the border is presented along the periphery of the camera viewport for the image data. For example, the border (e.g., customized or default) is scaled up within the user interface. The user interface may include a ring flash effect (e.g., glowing halo) along the periphery of the camera viewport, with the border being displayed on top of the ring flash effect. The user interface presents a bounce animation with respect to the camera viewport, with the border being displayed upon completion of the bounce animation.

In example embodiments, the user interface scales up the animated icon (e.g., custom or default) within a predefined area (e.g., top center and within the border). The animated icon may scale up to a predefined size (e.g., 30×30 pixels), and blink every predefined interval (e.g., every second). For example, the blinking includes changing opacity from 0% to 100% in 0.4 s, pausing for 3 s, and changing opacity from 100% to 0% in 0.3 s.

As such, the interaction client 104 updates display of the shutter button by replacing the shutter button with a capture button (e.g., if customized), or otherwise by scaling up and changing the color of the shutter button (e.g., if not customized). In addition, the interaction client 104 provides display of a border and animated icon (e.g., with customizations, if applicable). Updating the shutter button and displaying the border and animated icon provide an indication of video recording.

In example embodiments, the interaction client 104 provides additional indications of video recording in addition to the capture button and border. In this regard, the interaction client 104 replaces the first set of interface elements with a second set of interface elements within the user interface. As noted above, the first set of interface elements includes one or more of a profile button, a search button, a memories button, a carousel interface launch button, a toolbar or a tab bar. In example embodiments, the interaction client 104 causes the first set of interface elements to fade out in association with being replaced by the second set of interface elements.

In addition to the capture button, border and animated icon, the second set of interface elements includes one or more of: a hands-free icon which is user-selectable to initiate hands-free recording; and/or a flip camera icon which is user-selectable icon for switching between a front-facing camera and a rear-facing camera while the video recording is active.

In example embodiments, the interaction client 104 presents a "bounce" animation with respect to the camera viewport upon initial detection of the press-and-hold gesture. For example, the bounce animation scales down the camera viewport from its original size to a smaller size, and then scales up the camera viewport from the smaller size to its original size. The border is displayed upon completion of the bounce animation.

With respect to the icon for hands-free recording icon, the interaction client 104 scales up this icon within a predefined area of the user interface (e.g., to the left of the shutter button). Moreover, the interaction client 104 scales up the flip camera icon within a predefined area of the user interface (e.g., to the right of the shutter button).

In a case where the capture button is not customized, updating the appearance of the shutter button includes presenting a progress indicator along a periphery of the shutter button. The progress indicator provides a visual indication that the video recording is active and indicates progress of the video recording. For example, the progress indicator is displayed as an animation in which a carved-out segment positioned at the edge of the circle, travels around the circle in a clockwise manner and increases in size. The interaction client 104 provides for each full rotation of the carved-out segment around the circle to take a preset amount of time (e.g., 10 seconds to travel around the circle), with the carved-out segment resetting after each rotation.

As discussed further below with respect to FIG. 8, upon completion of each preset amount of time (e.g., 10 seconds), the interaction client 104 displays a preview icon associated with that video segment having the preset time length (e.g., 10 seconds). In example embodiments, the preview icon is a single video frame within the video segment that is automatically selected by the interaction client 104 and/or the interaction server system 110. Additional video segments of the preset time length (e.g., 10 seconds) are added as preview icons within the user interface, to create a series of video segments. For example, the interaction client 104 provides a visual approximation of the length of the video during recording (e.g., approximated as the number of preview icons x the preset time length).

As discussed further below with respect to FIG. 9, the interaction client 104 in conjunction with the interaction server system 110 provides for a multi-clip capture mode. The multi-clip capture mode is optional and can be selected for activation by the user. The multi-clip capture mode corresponds with capturing multiple video clips or pictures which are combinable to generate a media content item (e.g., for sending to a friend, broadcasting to others, etc.). The multi-clip capture mode provides for a preview bar in which each of the multiple video clips is represented by a thumbnail, and the thumbnails are presented in a combined clip. In example embodiments, the combined clip includes front and back handles for trimming the entirety of the combined clip. Moreover, the combined clip is selectable by the user, to trim (e g, via front and back handles for the individual clip), reorder and/or delete individual video clips. In the multi-clip capture mode, each clip is a separate video recording (e.g., associated with a respective press-and-hold gesture) or picture (e.g., associated with a respective tap gesture) taken by the user. The interaction client 104 is configured to display a message preview interface upon user completion of the combined clips. For example, the interaction client 104 provides a message preview button (e.g., an "edit and send" button) for redirecting to the message preview interface.

In a case where the multi-clip capture mode is disabled, the interaction client 104 determines that the user selected to stop video recording by detecting release of the press-and-hold gesture. In a case where the multi-clip capture mode is enabled, the interaction client 104 determines that the user selected to stop video recording by detecting user selection of the message preview button (e.g., the "edit and send" button).

If the user has not stopped video recording, the interaction client 104 continues to display the capture button and/or customized border with animated icon (e.g., if customized), or to display the updated shutter button and/or border with animated icon in a default manner (e.g., if not customized). Upon a determination that that the user stops video recording, the interaction client 104 redirects to a message preview interface.

As noted, the message preview interface provides for a media content item to be generated based on the video recording. In addition, the message preview interface includes editing tools for modifying/annotating (e.g., drawing on, adding text to, adding stickers to, cropping, and the like) the video recording. Moreover, the message preview interface includes interface elements (e.g., buttons) for one or more of: saving the video recording (e.g., with modifications/annotations) as a media content item; creating or updating a Story based on the video recording (e.g., with modifications/annotations); modifying audio signal(s) associated with the video recording; sending a media content item which includes the video recording (e.g., with modifications/annotations) to a contact/friend; and/or broadcasting the media content item in association with a feed interface (e.g., for viewing by other users who are not necessarily contacts/friends).

For multi-clip video capture, the message preview interface includes elements for one or more of: modifying/annotating (e.g., drawing on, adding text to, adding stickers to, cropping, and the like) the each of the captured video clips, combining the captured video clips (e.g., with modifications/annotations) and saving the combined video clips as a single media content item; creating or updating a Story based on the captured video clips (e.g., with modifications/annotations); modifying audio signal(s) associated with each of the captured video clips; sending a media content item which includes the captured video clips (e.g., with modifications/annotations) to a contact/friend; and/or broadcasting the media content item in association with a feed interface.

FIGS. 6A-6E illustrate example user interfaces 602-610 for customizing a capture button and border used during video recording, in accordance with some examples. For example, FIGS. 6A-6E depict a personal profile interface 602, an exclusive features interface 604, an app theme interface 606, a capture button selection interface 608 and a border selection interface 610.

As noted above, the interaction system 100 provides selected users with exclusive features that are not available to all users of the interaction system 100. For example, the selected users are those users who opt into a subscription plan. The subscription plan corresponds to a paid plan (e.g., a monthly subscription, a yearly subscription, etc.) that provides access to exclusive features within the interaction system 100. The exclusive features allow for customizing different user interfaces, or interface elements, displayed by the interaction client 104.

For example, the exclusive features include customizing the capture button, which replaces display of the shutter button and which indicates that video recording is active. As noted above, the shutter button initially appears as a circle with a border (e.g., white border) and no fill. During video recording, the interaction client 104 defaults to updating the shutter button by scaling up the circle and changing the entire circle into a solid color (e.g., yellow). However, the selected users (e.g., subscribers to exclusive features) are provided with user interfaces 602-610 with the option to select a capture button that replaces display of the shutter button during video recording. Other users of the interaction system 100 (e.g., those who did not opt into the subscription plan) are not provided with such user interfaces.

In another example, the exclusive features include customizing the border with animated icon used to indicate when video recording is active. As noted above, the border and animated icon are assigned a default color (e.g., yellow) with respect to video recording. The selected users are provided with user interfaces 602-610 for changing the color, while other users of the interaction system 100 (e.g., those who did not opt into the subscription plan) are not provided with such user interfaces.

Figure 6C:
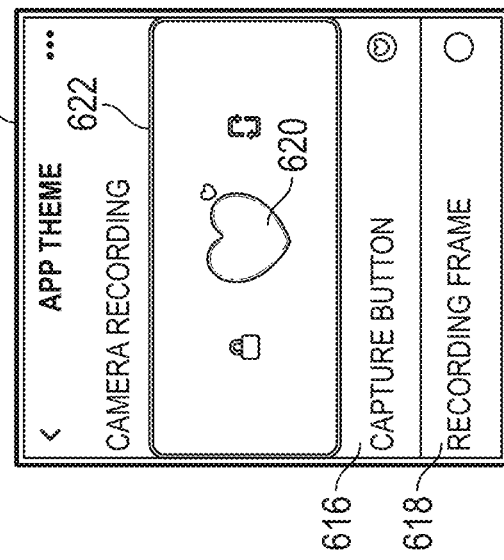
FIGS. 6A-6E illustrate example user interfaces for customizing a capture button and border used during video recording, in accordance with some examples.
Figure 6B:
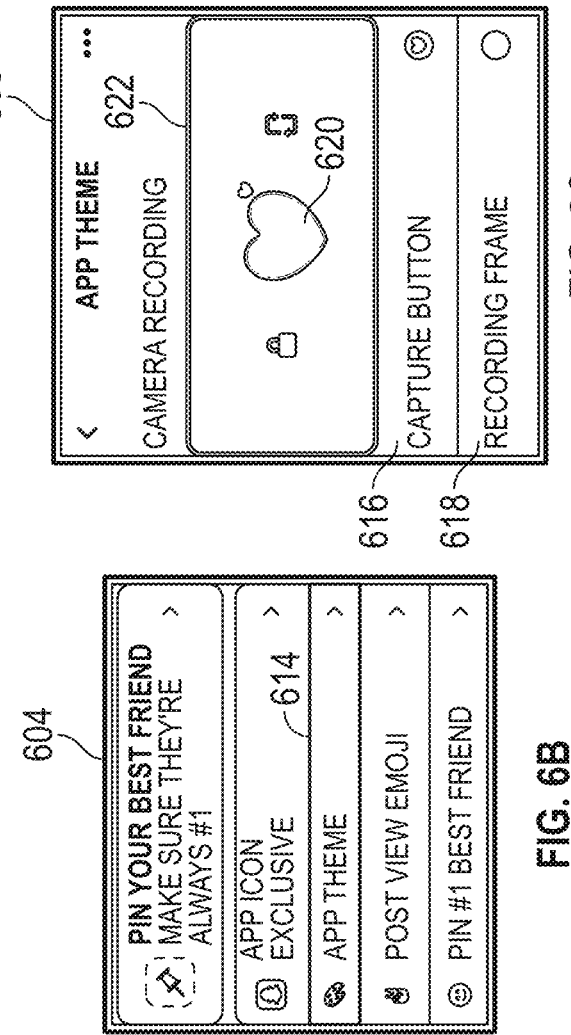
Figure 6A:
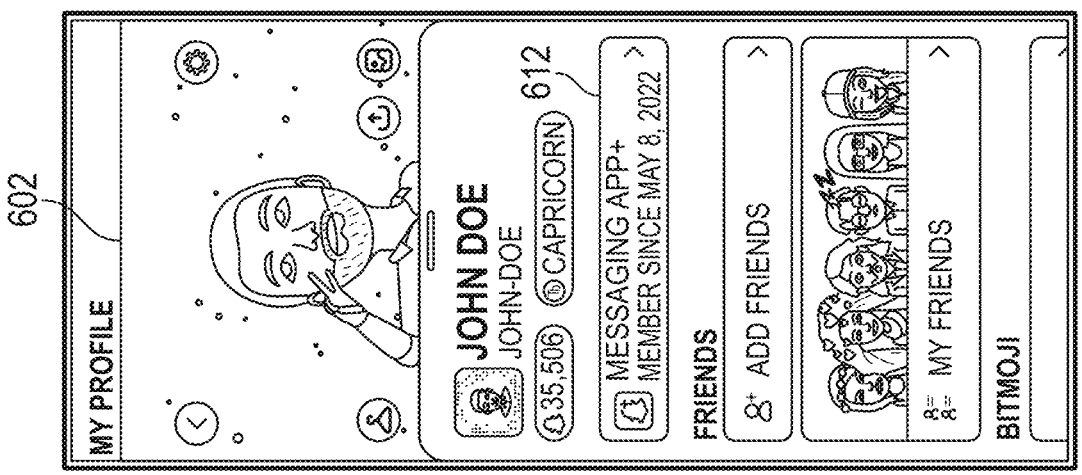

In the example of FIG. 6A, the interaction client 104 provides for a personal profile interface 602. For example, the personal profile interface 602 is accessible via user selection of a profile button (e.g., profile button 706 of FIG. 7A, discussed below). The personal profile interface 602 presents information about the end user, such as user name, telephone number, address, and/or friends (e.g., contacts) of the end user. Moreover, the personal profile interface 602 includes user-selectable options for updating account settings corresponding to the personal profile, such as personal avatar(s).

For the selected users (e.g., those opting into the subscription plan), the personal profile interface 602 provides additional options for updating account settings. For example, the personal profile interface 602 includes an exclusive features button 612 for redirecting to the exclusive features interface 604.

As shown in the example of FIG. 6B, the exclusive features interface 604 includes several options/customizations available to the end user (e.g., who opted into the subscription plan). One such customization is accessible via the app theme button 614. User selection of the app theme button 614 redirects to the app theme interface 606.

As shown in the example of FIG. 6C, the app theme interface 606 includes a capture button selection button 616 and a border selection button 618. User selection of the capture button selection button 616 redirects to the capture button selection interface 608, which is discussed further below with respect to FIG. 6D. On the other hand, user selection of the border selection button 618 redirects to the border selection interface 610, which is discussed further below with respect to FIG. 6E. In addition, the capture button preview 620 displays a preview of the currently-selected capture button, and the border preview 622 displays a preview of the currently-selected border.

Figure 6E:
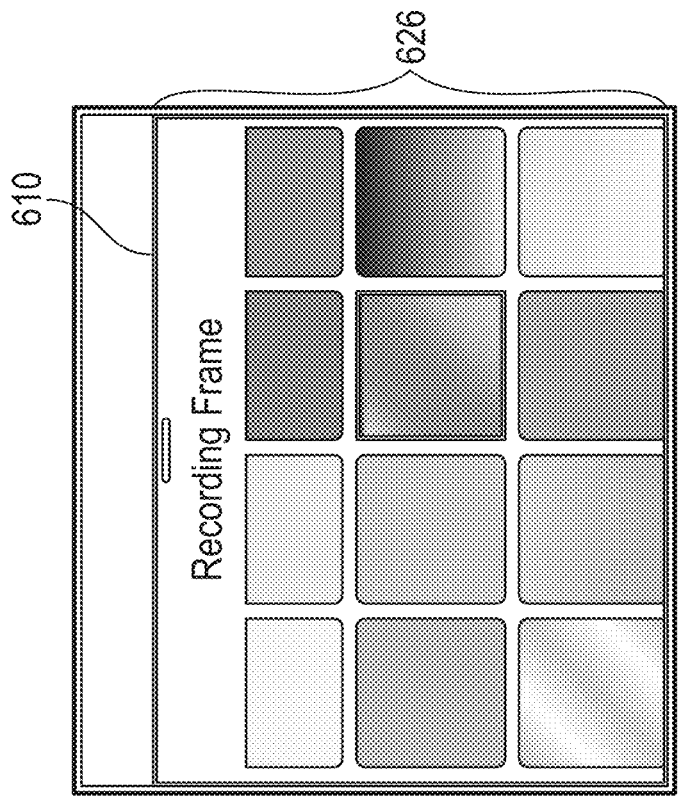
Figure 6D:
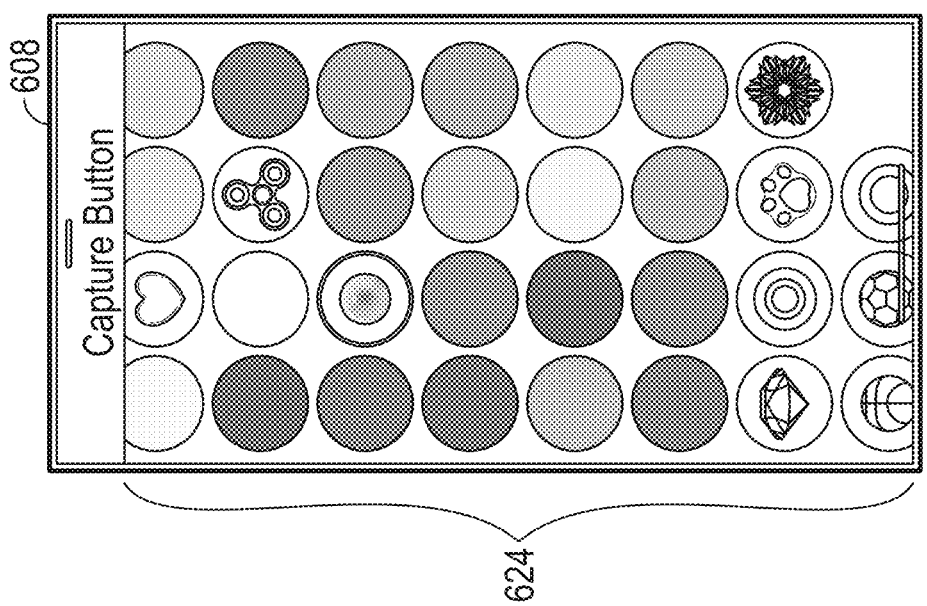

As shown in the example of FIG. 6D, the capture button selection interface 608 displays a list of available capture buttons 624. In example embodiments, the list of available capture buttons 624 is predetermined by an administrator of the interaction system 100. The interaction client 104 provides for the user to select a capture button from among the available capture buttons 624, thereby providing the user with a customized capture button. As shown in the example of FIG. 6D, the available capture buttons 624 include solid buttons, icon-based buttons, and the like. The available capture buttons 624 may include animated buttons. As noted above, the interaction server system 110 is configured to store an indication of the user-selected capture button, such that the capture button persists across different sessions with respect to the interaction client 104.

As shown in the example of FIG. 6E, the border selection interface 610 displays a list of available borders 626. In example embodiments, the list of available borders 626 is predetermined by an administrator of the interaction system 100. The interaction client 104 provides for the user to a select border from among the available borders 626, thereby providing the user with a customized border. As shown in the example of FIG. 6E, the available borders 626 include solid colors, patterns and combinations thereof. As noted above, the interaction server system 110 is configured to store an indication of the user-selected border, such that the border persists across different sessions with respect to the interaction client 104.

In example embodiments, the selection of the border also applies to the above-described animated icon. Thus, the border style (e.g., color, pattern, etc.) selected by the user via the border selection interface 610 applies to both the border and to the animated icon during video recording.

Figure 7A:
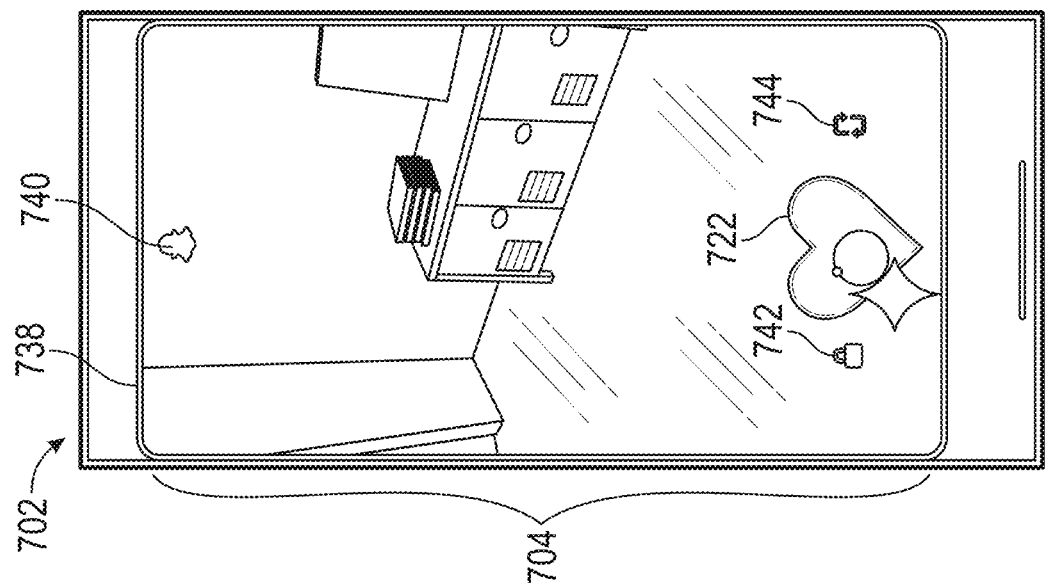
FIGS. 7A-7C illustrate an example user interface for displaying a customized capture button during video recording, in accordance with some examples.
Figure 7B:
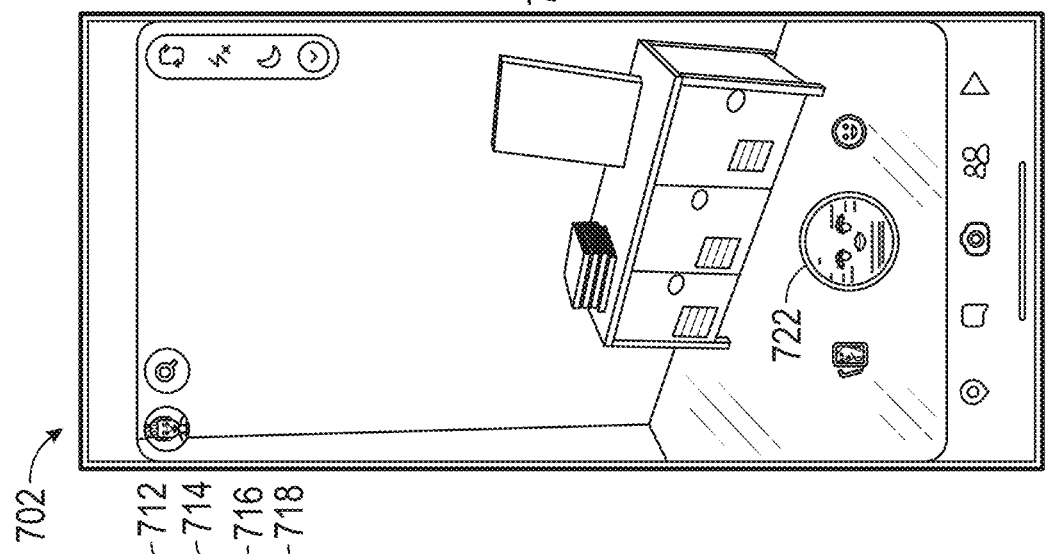
Figure 7C:
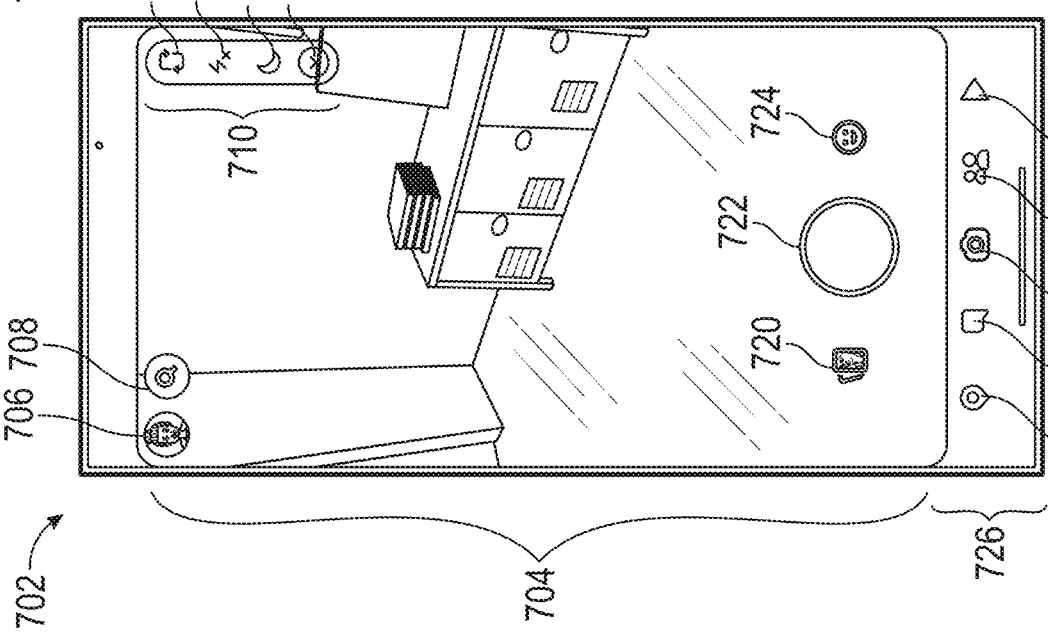

FIGS. 7A-7C illustrate an example user interface 702 for displaying a customized capture button during video recording, in accordance with some examples. In the example of FIG. 7A, the user interface 702 includes image data 704, a profile button 706, a search button 708, a toolbar 710 (which includes a flip camera button 712, a flash button 714, a night mode button 716 and an additional tools button 718), a memories button 720, a shutter button 722, a carousel interface launch button 724, and a tab bar 726 (which includes a map tab 728, a chat tab 730, a camera tab 732, a stories tab 734 and a discover tab 736).

For example, the user interface 702 of FIG. 7A corresponds to a camera interface which is presented upon startup of the interaction client 104. The interaction client 104 activates a camera (e.g., a front-facing camera, or a rear-facing camera) upon startup. The user interface 702 displays the captured image data 704 captured by the camera in real-time.

As noted above with respect to FIG. 5, the user interface 702 includes a first set of interface elements in conjunction with the real-time image data 704. For example, the profile button 706 is user-selectable to surface a user profile (e.g., the personal profile interface 602 of FIG. 6A), and the search button 708 is user-selectable to perform various types of searches within the interaction client 104.

In example embodiments, the first set of interface elements also includes the memories button 720 which is user-selectable to access saved media content items, and the carousel interface launch button 724 which is user-selectable to surface a carousel interface for augmented reality content. As noted above, the carousel interface (not shown) allows the user to cycle through and/or select different augmented reality content items, represented by respective icons, to apply with respect to the image data 704. Each augmented reality content item provides for adding a real-time special effect and/or sound to the image data 704. In example embodiments, the toolbar 710 includes the flip camera button 712 for switching between front and rear facing cameras, the flash button 714 for activating a flash of the camera, the night mode button 716 for enhancing dark scenes, and the additional tools button 718 for accessing additional modes/features (e.g., including the multi-clip capture mode).

Moreover, the tab bar 726 provides for navigating between tabs of the interaction client 104. By way of non-limiting example, the tab bar 726 includes the map tab 728 which is user-selectable to switch to a map interface which displays user icons or avatars on a map to indicate a current or past location of friends of a user, as well as media content generated by such friends, within the context of a map. The chat tab 730 is user-selectable to switch to a chat interface for communicating between friends of the user. The camera tab 732 is user-selectable to switch to the camera interface (e.g., corresponding to the user interface 702). The stories tab 734 is user-selectable to switch to a stories interface for accessing content collections (e.g., stories) from friends of the user, subscriptions and recommendations. Moreover, the discover tab 736 is user-selectable to switch to a discover interface for accessing original video content (e.g., as provided by an administrator of the interaction system 100), content collections (e.g., stories) that are currently trending on the interaction system 100, and/or content collections (e.g., stories) covering politics, entertainment, sports and more as provided by predetermined publishers (e.g., corporate partners).

As discussed above with respect to FIG. 5, the shutter button 722 is user-selectable to take a picture (e.g., in response to a press/tap gesture) or to record a video (e.g., in response to a press-and-hold gesture) of image data captured by the camera. When no augmented reality content item is selected, the shutter button 722 initially appears as a circle with a border (e.g., white border) and no fill as shown in FIG. 7A. When an augmented reality content item is selected, the shutter button 722 includes the respective icon as shown in FIG. 7B. The respective icon represents the currently-selected augmented reality content item and is centered within the circle. In a case of a press-and-hold gesture, the user interface 702 updates the shutter button 722 to indicate that video recording is active.

In the example of FIG. 7C, the user interface 702 provides indications that video recording is active. For example, the user interface 702 replaces the first set of interface elements (e.g., elements 706-720 and 724-736 of FIG. 7A) with a second set of interface elements (e.g., elements 738-744 of FIG. 7C). In example embodiments, the interaction client 104 causes the first set of interface elements to fade out in association with being replaced by the second set of interface elements.

During video recording, the shutter button 722 is updated in one of two manners. In a first case as shown in FIG. 7C, the user selected a customized capture button (e.g., via the capture button selection interface 608). Thus, the user interface 702 replaces display of the shutter button with display of the selected capture button. The selected capture button is displayed for the duration of video recording (e.g., the duration of the press-and-hold gesture). In a case where the capture button is animated, the user interface 702 displays the corresponding animations for the duration of video recording.

In a second case (e.g., not shown), if the user did not select a customized capture button, the user interface 702 updates the appearance of the shutter button 722 by scaling up the circle and changing the entire circle into a solid color (e.g., yellow). The user interface 702 updates the shutter button 722 in this manner for the duration of the video recording.

In addition to updating the shutter button 722, the user interface 702 displays the border 738 and the animated icon 740 to indicate that video recording is active. During video recording, the border 738 and the animated icon 740 are updated in one of two manners. In a first case, if the user selected a customized border (e.g., via the border selection interface 610), the user interface 702 presents the selected border 738 and the animated icon 740 for the duration of video recording (e.g., the duration of the press-and-hold gesture). In a second case, if the user did not select a customized border, the user interface 702 presents the border 738 and the animated icon 740 in a default manner (e.g., yellow) for the duration of video recording.

As noted above, the border 738 is presented along the periphery of the camera viewport for the image data 704. In example embodiments, the border (e.g., custom or default) is scaled up within the user interface 702. While not shown in the example of FIG. 7C, the user interface 702 may include a ring flash effect (e.g., glowing halo) along the periphery of the camera viewport, with the border 738 being displayed on top of the ring flash effect. The user interface 702 presents a bounce animation with respect to the camera viewport, with the border 738 being displayed upon completion of the bounce animation.

In example embodiments, the user interface 702 scales up the animated icon 740 (e.g., custom or default) within a predefined area (e.g., top center and within the border 738). The animated icon 740 may scale up to a predefined size (e.g., 30×30 pixels), and blink every predefined interval (e.g., every second). For example, the blinking includes changing opacity from 0% to 100% in 0.4 s, pausing for 3 s, and changing opacity from 100% to 0% in 0.3 s. In the example of FIG. 7C, the animated icon 740 is a ghost icon, but other icons may be used instead (e.g., a smiley face icon, a company logo, or another type of icon).

With respect to the hands-free icon 742, the user interface 702 scales up this icon within a predefined area (e.g., to the left of the shutter button 722). In the example of FIG. 7C, the hands-free icon 742 is depicted as a lock. The user may activate hands-free recording, with respect to the currently-active video recording, via a predefined gesture. For example, the predefined gesture is a slide left gesture while still holding the press-and-hold gesture in association with the shutter button 722.

Regarding the flip camera icon 744, the user interface 702 scales up this icon within a predefined area (e.g., to the right of the shutter button 722). The user may switch between the rear and front facing devices cameras, while still recording the current video, via a predefined gesture. For example, the predefined gesture is a slide right gesture while still holding the press-and-hold gesture.

FIG. 8 illustrates an example user interface 800 for displaying a customized capture button together with a preview icon, in accordance with some examples. Similar to the user interface 702 of FIG. 7C, the user interface 800 of FIG. 8 includes image data 802, a border 804, an animated icon 806, a hands-free icon 808, a shutter button 810 and a flip camera icon 812.

As noted above, the interaction client 104 displays a preview icon for each video segment having a preset time length (e.g., 10 seconds) during video recording. The preview icon is a single video frame within the video segment that is automatically selected by the interaction client 104 and/or the interaction server system 110. Additional video segments of the preset time length (e.g., 10 seconds) are added as preview icons within the user interface, to create a series of video segments. In this manner, the interaction client 104 provides a visual approximation of the length of the video during recording (e.g., approximated as the number of preview icons x the preset time length).

The example of FIG. 8 illustrates a single preview icon 814. For example, this indicates that the length of the video recording is greater than the preset time length (e.g., >10 seconds) and less 2 times the present time length (e.g., <20 seconds).

In the example of FIG. 8, the user selected a custom shutter button 810 (e.g., via the capture button selection interface 608). Thus, the user interface 800 replaces display of the initial shutter button (e.g., circle with white border) with display of the selected shutter button 810. The selected shutter button 810 is displayed for the duration of video recording (e.g., the duration of the press-and-hold gesture). In a case where the shutter button 810 is animated, the user interface 800 displays the corresponding animations for the duration of video recording.

FIG. 9 illustrates an example user interface 900 for displaying a customized capture button in association with a multi-clip capture mode, in accordance with some examples. Similar to the user interface 702 of FIG. 7C, the user interface 900 of FIG. 9 includes image data 902, a border 904, an animated icon 906, a hands-free icon 908, a shutter button 910 and a flip camera icon 912.

As noted above with respect to FIG. 5, the interaction client 104 in conjunction with the interaction server system 110 provides for a multi-clip capture mode. The multi-clip capture mode is optional and can be selected for activation by the user (e.g., as an option accessible via the additional tools button 718 of FIG. 7A). The multi-clip capture mode corresponds with capturing multiple video clips or pictures which are combinable to generate a media content item (e.g., for sending to a friend, broadcasting to others, etc.).

The multi-clip capture mode provides for a preview bar (not shown) in which each of the multiple video clips is represented by a thumbnail, and the thumbnails are presented in a combined clip. In example embodiments, the combined clip includes front and back handles for trimming the entirety of the combined clip. Moreover, the combined clip is selectable by the user, to trim (e.g., via front and back handles for the individual clip), reorder and/or delete individual video clips.

In the multi-clip capture mode, each clip is a separate video recording (e.g., associated with a respective press-and-hold gesture) or picture (e.g., associated with a respective tap gesture) taken by the user. The interaction client 104 is configured to display the message preview interface upon user completion of the combined clips. For example, the user interface 900 includes a message preview button 914 (e.g., an "edit and send" button) for redirecting to the message preview interface.

With respect to the captured video clips, the message preview interface includes elements for one or more of: modifying/annotating the each of the captured video clips; combining the captured video clips and saving the combined video clips as a single media content item; creating or updating a Story based on the captured video clips; modifying audio signal(s) associated with the captured video clips; sending a media content item which includes the captured video clips to a contact/friend; and/or broadcasting the media content item in association with a feed interface.

In the example of FIG. 9, the user selected a custom shutter button 910 (e.g., via the capture button selection interface 608). Thus, the user interface 900 replaces display of the initial shutter button (e.g., circle with white border) with display of the selected shutter button 910. The selected shutter button 910 is displayed for the duration of video recording (e.g., the duration of the press-and-hold gesture). In a case where the shutter button 910 is animated, the user interface 900 displays the corresponding animations for the duration of video recording.

Figure 10:
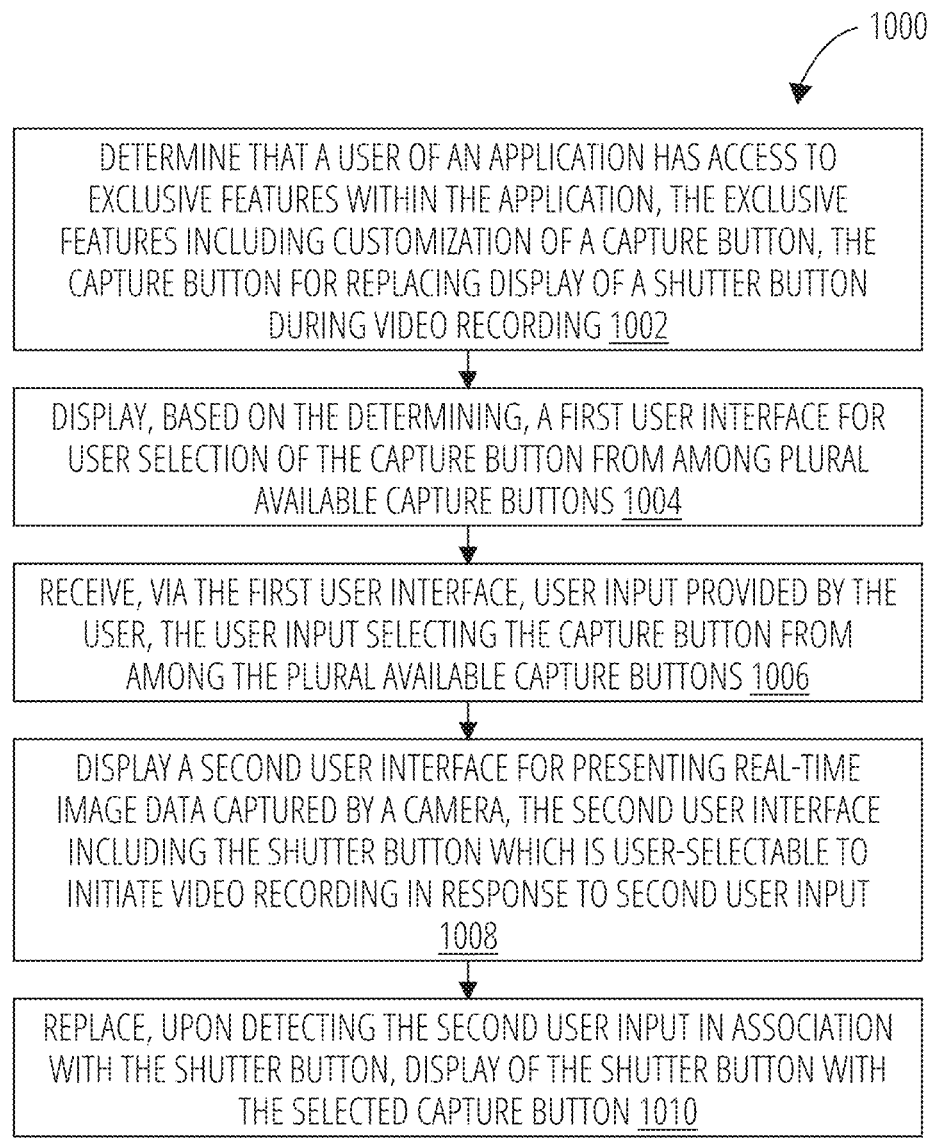
FIG. 10 is a flowchart illustrating a process for customizing a capture button, in accordance with some examples.

FIG. 10 is a flowchart illustrating a process 1000 for customizing a capture button, in accordance with some examples. For explanatory purposes, the process 1000 is primarily described herein with reference to the interaction client 104 of FIG. 1. However, one or more blocks (or operations) of the process 1000 may be performed by one or more other components, and/or by other suitable devices. Further for explanatory purposes, the blocks (or operations) of the process 1000 are described herein as occurring in serial, or linearly. However, multiple blocks (or operations) of the process 1000 may occur in parallel or concurrently. In addition, the blocks (or operations) of the process 1000 need not be performed in the order shown and/or one or more blocks (or operations) of the process 1000 need not be performed and/or can be replaced by other operations. The process 1000 may be terminated when its operations are completed. In addition, the process 1000 may correspond to a method, a procedure, an algorithm, etc.

The interaction client 104 determines that a user of an application has access to exclusive features within the application (block 1002). The exclusive features include customizing a capture button, the capture button for replacing display of a shutter button during video recording. The interaction client 104 displays, based on the determining, a first user interface for user selection of the capture button from among plural available capture buttons (block 1004). In example embodiments, the plural available capture buttons include animated buttons.

The interaction client 104 receives, via the first user interface, user input provided by the user, the user input selecting the capture button from among the plural available capture buttons (block 1006). The interaction client 104 displays a second user interface for presenting real-time image data captured by a camera, the second user interface including the shutter button which is user-selectable to initiate video recording in response to second user input (block 1008). In example embodiments, the shutter button is also user-selectable to take a picture in response to third user input (e.g., a tap gesture).

The interaction client 104 replaces, upon detecting the second user input in association with the shutter button, display of the shutter button with the selected capture button (block 1010). In example embodiments, the interaction client 104 provides, upon detecting the second user input in association with the shutter button, plural indications within the second user interface that video recording is active, by replacing a first set of interface elements within the second user interface with a second set of interface elements within the second user interface.

The first set of interface elements includes at least one of a profile button for surfacing a user profile, a search button for performing various types of searches within the application, a memories button for accessing saved media content items, a carousel button for activating a carousel interface to switch between augmented reality content items, a toolbar for activating a flash for the camera or for switching between front and rear facing cameras, or a tab bar for navigating between tabs of the application. On the other hand, the second set of interface elements includes at least one of a border which frames the real-time image data, an animated icon within the second user interface, a first user-selectable icon for initiating hands-free video recording, or a second user-selectable icon for switching between front and rear facing cameras while video recording is active.

In example embodiments, the second user input is a press-and-hold gesture. Display of the shutter button is replaced by display of the selected capture button for a duration of the press-and-hold gesture. The plural indications are provided for the duration of the press-and-hold gesture Upon detecting a release of the press-and-hold gesture, the interaction client 104 causes the video recording to stop, and switches from the second user interface to a third user interface for previewing and modifying the video recording.

Machine Architecture

Figure 11:
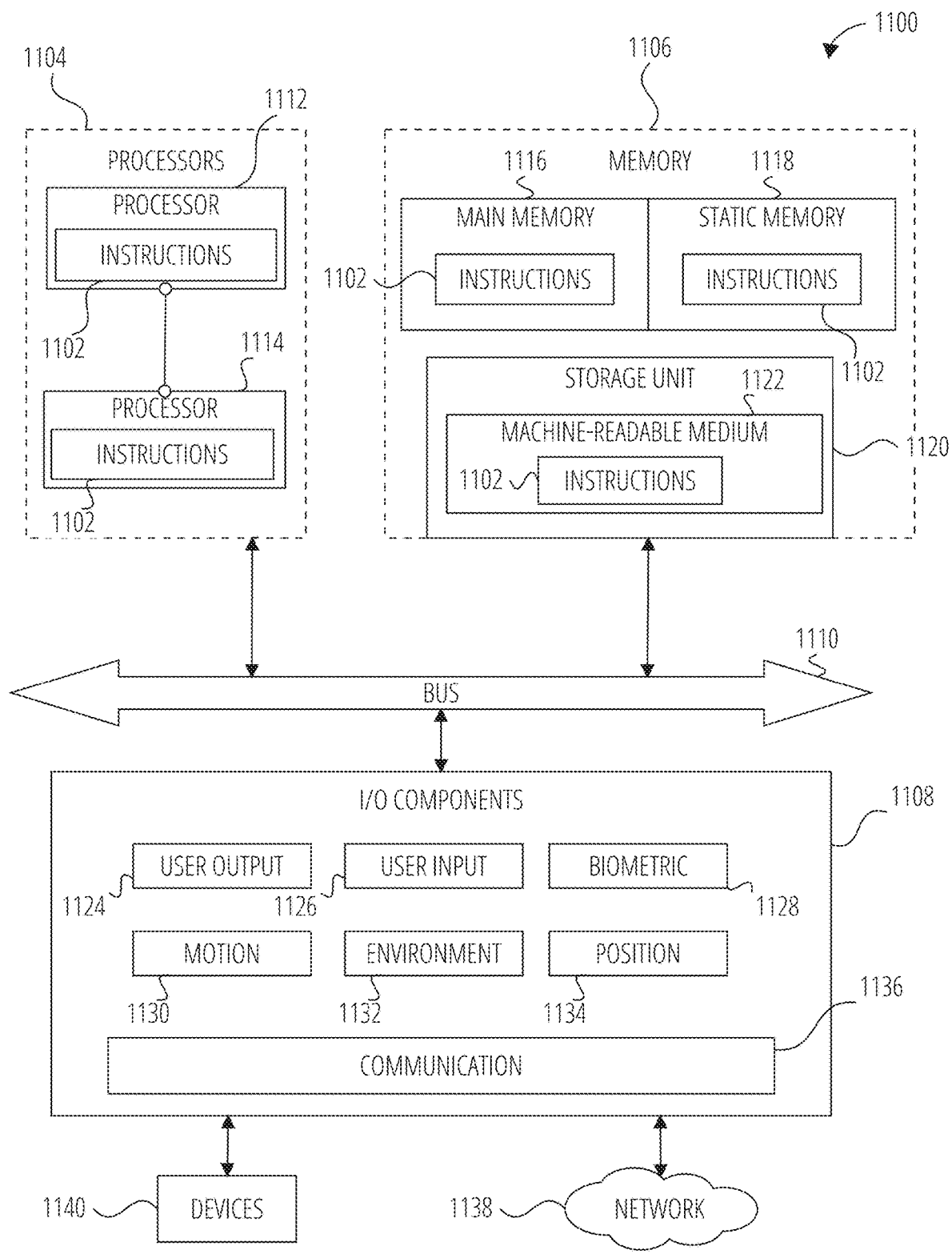
FIG. 11 is a diagrammatic representation of a machine in the form of a computer system within which a set of instructions may be executed to cause the machine to perform any one or more of the methodologies discussed herein, according to some examples.

FIG. 11 is a diagrammatic representation of the machine 1100 within which instructions 1102 (e.g., software, a program, an application, an applet, an app, or other executable code) for causing the machine 1100 to perform any one or more of the methodologies discussed herein may be executed. For example, the instructions 1102 may cause the machine 1100 to execute any one or more of the methods described herein. The instructions 1102 transform the general, non-programmed machine 1100 into a particular machine 1100 programmed to carry out the described and illustrated functions in the manner described. The machine 1100 may operate as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1102, sequentially or otherwise, that specify actions to be taken by the machine 1100. Further, while a single machine 1100 is illustrated, the term "machine" shall also be taken to include a collection of machines that individually or jointly execute the instructions 1102 to perform any one or more of the methodologies discussed herein. The machine 1100, for example, may comprise the user system 102 or any one of multiple server devices forming part of the interaction server system 110. In some examples, the machine 1100 may also comprise both client and server systems, with certain operations of a particular method or algorithm being performed on the server-side and with certain operations of the particular method or algorithm being performed on the client-side.

The machine 1100 may include processors 1104, memory 1106, and input/output I/O components 1108, which may be configured to communicate with each other via a bus 1110. In an example, the processors 1104 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1112 and a processor 1114 that execute the instructions 1102. The term "processor" is intended to include multi-core processors that may comprise two or more independent processors (sometimes referred to as "cores") that may execute instructions contemporaneously. Although FIG. 11 shows multiple processors 1104, the machine 1100 may include a single processor with a single-core, a single processor with multiple cores (e.g., a multi-core processor), multiple processors with a single core, multiple processors with multiples cores, or any combination thereof.

The memory 1106 includes a main memory 1116, a static memory 1118, and a storage unit 1120, both accessible to the processors 1104 via the bus 1110. The main memory 1106, the static memory 1118, and storage unit 1120 store the instructions 1102 embodying any one or more of the methodologies or functions described herein. The instructions 1102 may also reside, completely or partially, within the main memory 1116, within the static memory 1118, within machine-readable medium 1122 within the storage unit 1120, within at least one of the processors 1104 (e.g., within the processor's cache memory), or any suitable combination thereof, during execution thereof by the machine 1100.

The I/O components 1108 may include a wide variety of components to receive input, provide output, produce output, transmit information, exchange information, capture measurements, and so on. The specific I/O) components 1108 that are included in a particular machine will depend on the type of machine. For example, portable machines such as mobile phones may include a touch input device or other such input mechanisms, while a headless server machine will likely not include such a touch input device. It will be appreciated that the I/O) components 1108 may include many other components that are not shown in FIG. 11. In various examples, the I/O components 1108 may include user output components 1124 and user input components 1126. The user output components 1124 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1126 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1108 may include biometric components 1128, motion components 1130, environmental components 1132, or position components 1134, among a wide array of other components. For example, the biometric components 1128 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1130 include acceleration sensor components (e.g., accelerometer), gravitation sensor components, rotation sensor components (e.g., gyroscope).

The environmental components 1132 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the user system 102 may have a camera system comprising, for example, front cameras on a front surface of the user system 102 and rear cameras on a rear surface of the user system 102. The front cameras may, for example, be used to capture still images and video of a user of the user system 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the user system 102 may also include a 360° camera for capturing 360° photographs and videos.

Further, the camera system of the user system 102 may include dual rear cameras (e.g., a primary camera as well as a depth-sensing camera), or even triple, quad or penta rear camera configurations on the front and rear sides of the user system 102. These multiple cameras systems may include a wide camera, an ultra-wide camera, a telephoto camera, a macro camera, and a depth sensor, for example.

The position components 1134 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1108 further include communication components 1136 operable to couple the machine 1100 to a network 1138 or devices 1140 via respective coupling or connections. For example, the communication components 1136 may include a network interface component or another suitable device to interface with the network 1138. In further examples, the communication components 1136 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1140 may be another machine or any of a wide variety of peripheral devices (e.g., a peripheral device coupled via a USB).

Moreover, the communication components 1136 may detect identifiers or include components operable to detect identifiers. For example, the communication components 1136 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1136, such as location via Internet Protocol (IP) geolocation, location via Wi-Fi® signal triangulation, location via detecting an NFC beacon signal that may indicate a particular location, and so forth.

The various memories (e.g., main memory 1116, static memory 1118, and memory of the processors 1104) and storage unit 1120 may store one or more sets of instructions and data structures (e.g., software) embodying or used by any one or more of the methodologies or functions described herein. These instructions (e.g., the instructions 1102), when executed by processors 1104, cause various operations to implement the disclosed examples.

The instructions 1102 may be transmitted or received over the network 1138, using a transmission medium, via a network interface device (e.g., a network interface component included in the communication components 1136) and using any one of several well-known transfer protocols (e.g., hypertext transfer protocol (HTTP)). Similarly, the instructions 1102 may be transmitted or received using a transmission medium via a coupling (e g, a peer-to-peer coupling) to the devices 1140.

Software Architecture

Figure 12:
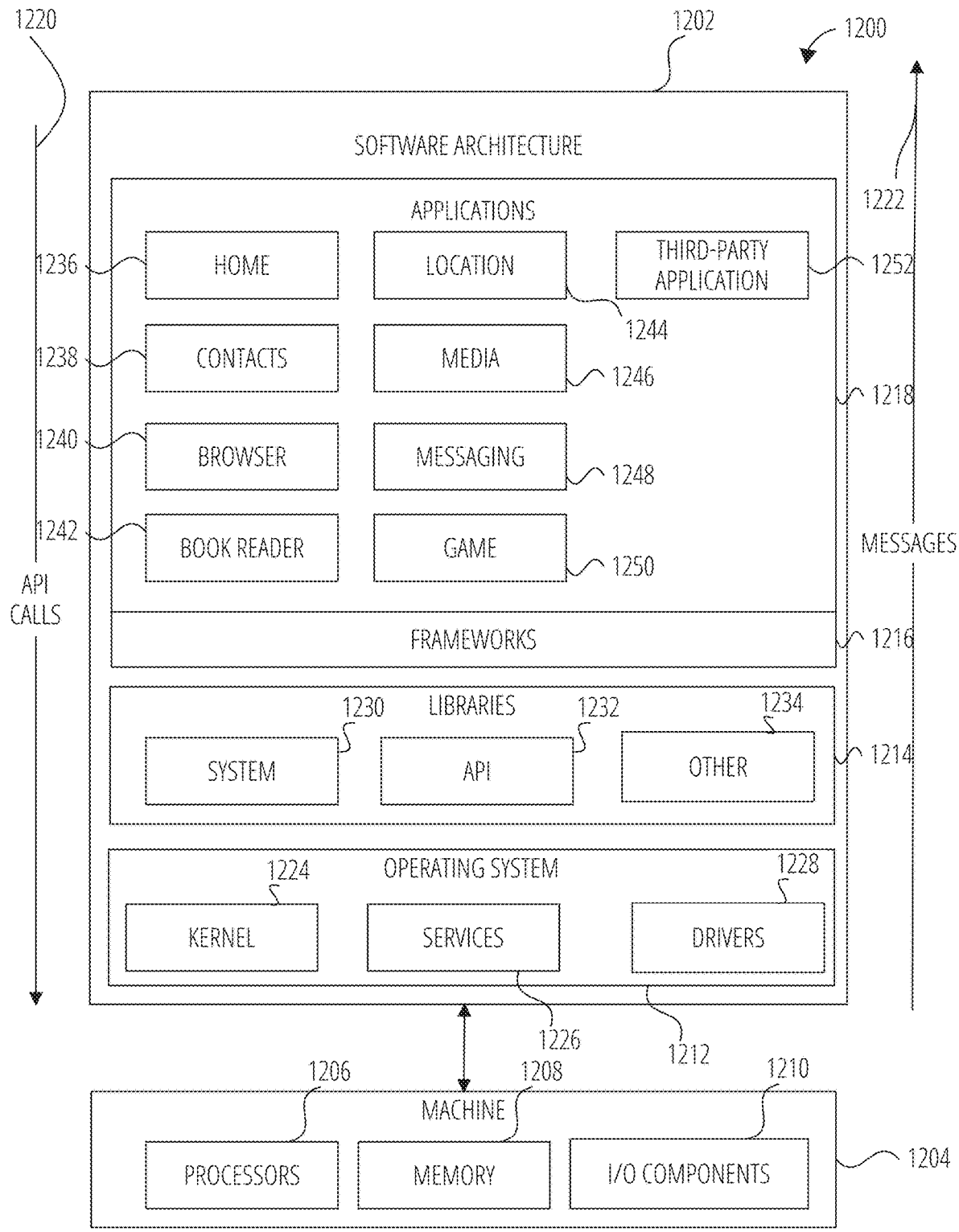
FIG. 12 is a block diagram showing a software architecture within which examples may be implemented.

FIG. 12 is a block diagram 1200 illustrating a software architecture 1202, which can be installed on any one or more of the devices described herein. The software architecture 1202 is supported by hardware such as a machine 1204 that includes processors 1206, memory 1208, and I/O components 1210. In this example, the software architecture 1202 can be conceptualized as a stack of layers, where each layer provides a particular functionality. The software architecture 1202 includes layers such as an operating system 1212, libraries 1214, frameworks 1216, and applications 1218. Operationally, the applications 1218 invoke API calls 1220 through the software stack and receive messages 1222 in response to the API calls 1220.

The operating system 1212 manages hardware resources and provides common services. The operating system 1212 includes, for example, a kernel 1224, services 1226, and drivers 1228. The kernel 1224 acts as an abstraction layer between the hardware and the other software layers. For example, the kernel 1224 provides memory management, processor management (e.g., scheduling), component management, networking, and security settings, among other functionalities. The services 1226 can provide other common services for the other software layers. The drivers 1228 are responsible for controlling or interfacing with the underlying hardware. For instance, the drivers 1228 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1214 provide a common low-level infrastructure used by the applications 1218. The libraries 1214 can include system libraries 1230 (e.g., C standard library) that provide functions such as memory allocation functions, string manipulation functions, mathematic functions, and the like. In addition, the libraries 1214 can include API libraries 1232 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1214 can also include a wide variety of other libraries 1234 to provide many other APIs to the applications 1218.

The frameworks 1216 provide a common high-level infrastructure that is used by the applications 1218. For example, the frameworks 1216 provide various graphical user interface (GUI) functions, high-level resource management, and high-level location services. The frameworks 1216 can provide a broad spectrum of other APIs that can be used by the applications 1218, some of which may be specific to a particular operating system or platform.

In an example, the applications 1218 may include a home application 1236, a contacts application 1238, a browser application 1240, a book reader application 1242, a location application 1244, a media application 1246, a messaging application 1248, a game application 1250, and a broad assortment of other applications such as a third-party application 1252. The applications 1218 are programs that execute functions defined in the programs. Various programming languages can be employed to create one or more of the applications 1218, structured in a variety of manners, such as object-oriented programming languages (e.g., Objective-C, Java, or C++) or procedural programming languages (e.g., C or assembly language). In a specific example, the third-party application 1252 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1252 can invoke the API calls 1220 provided by the operating system 1212 to facilitate functionalities described herein.

CONCLUSION

Thus, the interaction system 100 as described herein provides selected users (e.g., those who opt into a subscription plan) with exclusive features associated with video recording. The exclusive features include customization of a capture button, which replaces display of the shutter button during video recording. In example embodiments, the shutter button initially appears as a circle with a border (e.g., white border) and no fill. Without a customized capture button, the interaction client 104 defaults to updating the shutter button by scaling up the circle and changing the entire circle into a solid color (e.g., yellow). However, the selected users (e.g., subscribers to the exclusive features) are provided user interfaces for selecting a capture button, from a list of available capture buttons, for replacing display of the shutter button during video recording.

In addition, the exclusive features include customizing a border together with an animated icon used to indicate that video recording is active. In example embodiments, the border and animated icon are assigned a default color (e.g., yellow) with respect to video recording. However, the selected users are provided with user interfaces for selecting a custom color/pattern, while other users (e.g., those who did not opt into the subscription plan) are not provided with such user interfaces.

By virtue of providing for customization of a capture button, border and animated icon used to indicate video recording, the interaction client 104 provides increased interactive feedback and facilitates video recording Without providing such indications, the status and progress of video recording may be difficult to determine. Thus, the interaction client 104 facilitates the capturing of videos, thereby saving time for the user (e.g., by reducing the number of retakes), and reducing computational resources/processing power for the interaction system 100.

Glossary

"Carrier signal" refers, for example, to any intangible medium that is capable of storing, encoding, or carrying instructions for execution by the machine and includes digital or analog communications signals or other intangible media to facilitate communication of such instructions. Instructions may be transmitted or received over a network using a transmission medium via a network interface device.

"Client device" refers, for example, to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers, for example, to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers, for example, to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers, for example, to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Machine storage medium" refers, for example, to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers, for example, to a tangible medium that is capable of storing, encoding, or carrying the instructions for execution by a machine.

"Signal medium" refers, for example, to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

"User device" refers, for example, to a device accessed, controlled or owned by a user and with which the user interacts perform an action, or an interaction with other users or computer systems.

What is claimed is:

1. A device comprising:
   a processor; and
   a memory storing instructions that, when executed by the processor, configure the processor to perform operations comprising:
   displaying a first user interface for user selection of a capture button from among plural available capture buttons, the capture button for replacing display of a shutter button during video recording;
   receiving, via the first user interface, user input provided by the user, the user input selecting the capture button from among the plural available capture buttons;
   displaying a second user interface for presenting real-time image data captured by a camera, the second user interface including the shutter button which is user-selectable to initiate video recording in response to second user input; and
   replacing, upon detecting the second user input in association with the shutter button, display of the shutter button with the selected capture button;
   providing, upon detecting the second user input in association with the shutter button, plural indications within the second user interface that video recording is active, by replacing a first set of interface elements within the second user interface with a second set of interface elements within the second user interface,
   wherein the first set of interface elements comprises at least one of a profile button for surfacing a user profile, a search button for performing various types of searches within an application, a memories button for accessing saved media content items, a carousel button for activating a carousel interface to switch between augmented reality content items, a toolbar for activating a flash for the camera or for switching between front and rear facing cameras, or a tab bar for navigating between tabs of the application.

2. The device of claim 1, the operations further comprising:
   determining that a user of the application has access to exclusive features within the application, the exclusive features including customizing the capture button.

3. The device of claim 1, wherein the plural available capture buttons include animated buttons.

4. The device of claim 1, wherein the second set of interface elements comprises an animated icon within the second user interface.

5. The device of claim 1, wherein the second user input comprises a press-and-hold gesture, wherein display of the shutter button is replaced by display of the selected capture button for a duration of the press-and-hold gesture, and wherein the plural indications are provided for the duration of the press-and-hold gesture.

6. The device of claim 1, wherein the shutter button is user-selectable to take a picture in response to third user input comprising a tap gesture.

7. A device comprising:
a processor; and
a memory storing instructions that, when executed by the processor, configure the processor to perform operations comprising:
displaying a first user interface for user selection of a capture button from among plural available capture buttons, the capture button for replacing display of a shutter button during video recording;
receiving, via the first user interface, user input provided by the user, the user input selecting the capture button from among the plural available capture buttons;
displaying a second user interface for presenting real-time image data captured by a camera, the second user interface including the shutter button which is user-selectable to initiate video recording in response to second user input; and
replacing, upon detecting the second user input in association with the shutter button, display of the shutter button with the selected capture button;
providing, upon detecting the second user input in association with the shutter button, plural indications within the second user interface that video recording is active, by replacing a first set of interface elements within the second user interface with a second set of interface elements within the second user interface,
wherein the second set of interface elements comprises a border which frames the real-time image data.

8. A device comprising:
a processor; and
a memory storing instructions that, when executed by the processor, configure the processor to perform operations comprising:
displaying a first user interface for user selection of a capture button from among plural available capture buttons, the capture button for replacing display of a shutter button during video recording;
receiving, via the first user interface, user input provided by the user, the user input selecting the capture button from among the plural available capture buttons;
displaying a second user interface for presenting real-time image data captured by a camera, the second user interface including the shutter button which is user-selectable to initiate video recording in response to second user input; and
replacing, upon detecting the second user input in association with the shutter button, display of the shutter button with the selected capture button;
providing, upon detecting the second user input in association with the shutter button, plural indications within the second user interface that video recording is active, by replacing a first set of interface elements within the second user interface with a second set of interface elements within the second user interface,
wherein the second set of interface elements comprises a first user-selectable icon for initiating hands-free video recording and a second user-selectable icon for switching between front and rear facing cameras while video recording is active.

9. A device comprising;
a processor; and
a memory storing instructions that, when executed by the processor, configure the processor to perform operations comprising:
displaying a first user interface for user selection of a capture button from among plural available capture buttons, the capture button for replacing display of a shutter button during video recording;
receiving, via the first user interface, user input provided by the user, the user input selecting the capture button from among the plural available capture buttons;
displaying a second user interface for presenting real-time image data captured by a camera, the second user interface including the shutter button which is user-selectable to initiate video recording in response to second user input; and
replacing, upon detecting the second user input in association with the shutter button, display of the shutter button with the selected capture button;
providing, upon detecting the second user input in association with the shutter button, plural indications within the second user interface that video recording is active, by replacing a first set of interface elements within the second user interface with a second set of interface elements within the second user interface,
wherein the second user input comprises a press-and-hold gesture,
wherein display of the shutter button is replaced by display of the selected capture button for a duration of the press-and-hold gesture, and
wherein the plural indications are provided for the duration of the press-and-hold gesture;
upon detecting a release of the press-and-hold gesture:
causing the video recording to stop; and
switching from the second user interface to a third user interface for previewing and modifying the video recording.

10. A method, comprising:
displaying a first user interface for user selection of a capture button from among plural available capture buttons, the capture button for replacing display of a shutter button during video recording;
receiving, via the first user interface, user input provided by the user, the user input selecting the capture button from among the plural available capture buttons;
displaying a second user interface for presenting real-time image data captured by a camera, the second user interface including the shutter button which is user-selectable to initiate video recording in response to second user input; and
replacing, upon detecting the second user input in association with the shutter button, display of the shutter button with the selected capture button;
providing, upon detecting the second user input in association with the shutter button, plural indications within the second user interface that video recording is active, by replacing a first set of interface elements within the second user interface with a second set of interface elements within the second user interface,
wherein the first set of interface elements comprises at least one of a profile button for surfacing a user profile, a search button for performing various types of searches within an application, a memories button for accessing saved media content items, a carousel button for activating a carousel interface to switch between augmented reality content items, a toolbar for activating a flash for the camera or for switching between front and rear facing cameras, or a tab bar for navigating between tabs of the application.

11. The method of claim 10, further comprising:
determining that a user of the application has access to exclusive features within the application, the exclusive features including customizing the capture button.

12. The method of claim 10, wherein the plural available capture buttons include animated buttons.

13. The method of claim 10, wherein the second set of interface elements comprises a border which frames the real-time image data.

14. The method of claim 10, wherein the second set of interface elements comprises an animated icon within the second user interface.

15. The method of claim 10, wherein the second set of interface elements comprises a first user-selectable icon for initiating hands-free video recording and a second user-selectable icon for switching between front and rear facing cameras while video recording is active.

16. The method of claim 10, wherein the second user input comprises a press-and-hold gesture,
wherein display of the shutter button is replaced by display of the selected capture button for a duration of the press-and-hold gesture, and
wherein the plural indications are provided for the duration of the press-and-hold gesture.

17. The method of claim 16, further comprising, upon detecting a release of the press-and-hold gesture:
causing the video recording to stop; and
switching from the second user interface to a third user interface for previewing and modifying the video recording.

18. A non-transitory computer-readable storage medium, the computer-readable storage medium including instructions that when executed by a computer, cause the computer to perform operations comprising:
displaying a first user interface for user selection of a capture button from among plural available capture buttons, the capture button for replacing display of a shutter button during video recording;
receiving, via the first user interface, user input provided by the user, the user input selecting the capture button from among the plural available capture buttons;
displaying a second user interface for presenting real-time image data captured by a camera, the second user interface including the shutter button which is user-selectable to initiate video recording in response to second user input; and
replacing, upon detecting the second user input in association with the shutter button, display of the shutter button with the selected capture button;
providing, upon detecting the second user input in association with the shutter button, plural indications within the second user interface that video recording is active, by replacing a first set of interface elements within the second user interface with a second set of interface elements within the second user interface,
wherein the first set of interface elements comprises at least one of a profile button for surfacing a user profile, a search button for performing various types of searches within an application, a memories button for accessing saved media content items, a carousel button for activating a carousel interface to switch between augmented reality content items, a toolbar for activating a flash for the camera or for switching between front and rear facing cameras, or a tab bar for navigating between tabs of the application.

* * * * *